(12) United States Patent
Sonoda et al.

(10) Patent No.: US 12,531,953 B2
(45) Date of Patent: Jan. 20, 2026

(54) CONTROL DEVICE WITH RECOGNIZING INSTRUCTION FUNCTION OF DIGITAL CAMERA WITH PRINTER, OPERATION METHOD FOR CONTROL DEVICE OF DIGITAL CAMERA WITH PRINTER, AND OPERATION PROGRAM FOR CONTROL DEVICE OF DIGITAL CAMERA WITH PRINTER

(71) Applicant: FUJIFILM Corporation, Tokyo (JP)

(72) Inventors: Shinichiro Sonoda, Kanagawa (JP); Hirotoshi Yoshizawa, Kanagawa (JP); Nobuya Tanaka, Kanagawa (JP); Hajime Terayoko, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 17/878,861

(22) Filed: Aug. 1, 2022

(65) Prior Publication Data

US 2022/0377185 A1    Nov. 24, 2022

Related U.S. Application Data

(63) Continuation of application No. PCT/JP2020/038540, filed on Oct. 12, 2020.

(30) Foreign Application Priority Data

Feb. 28, 2020    (JP) .................. 2020-034193

(51) Int. Cl.
*H04N 1/00* (2006.01)
*H04N 1/23* (2006.01)
(Continued)

(52) U.S. Cl.
CPC ..... *H04N 1/00251* (2013.01); *H04N 1/00172* (2013.01); *H04N 1/00188* (2013.01);
(Continued)

(58) Field of Classification Search
CPC ........... H04N 1/00251; H04N 1/00172; H04N 1/00188; H04N 1/00381; H04N 1/00403;
(Continued)

(56) References Cited

U.S. PATENT DOCUMENTS

2015/0229837 A1* 8/2015 Her ...................... H04N 23/611
  348/222.1
2015/0288883 A1* 10/2015 Shigeta .................. H04N 23/61
  345/642
(Continued)

FOREIGN PATENT DOCUMENTS

JP   H07139742    5/1995
JP   H11252491    9/1999
(Continued)

OTHER PUBLICATIONS

"International Search Report (Form PCT/ISA/210) of PCT/JP2020/038540," mailed on Dec. 22, 2020, with English translation thereof, pp. 1-5.
(Continued)

*Primary Examiner* — Nicholas Pachol
(74) *Attorney, Agent, or Firm* — JCIPRNET

(57) ABSTRACT

The processor recognizes a first act for an imaging and print instruction that combines an imaging instruction and an instruction to print an image, the first act being performed by a person to be imaged who is included in a subject and within an imaging range of a camera unit, causes the camera unit to perform an imaging operation of outputting an image required to be printed in a case where the first act is recognized, recognizes a second act for an instruction to stop printing the image required to be printed, and causes a printer unit to print the image required to be printed in a case where the second act is not recognized during a predetermined print standby period and instructs the printer unit to
(Continued)

stop printing the image required to be printed in a case where the second act is recognized during the print standby period.

11 Claims, 32 Drawing Sheets

(51) Int. Cl.
*H04N 23/611* (2023.01)
*G06F 3/01* (2006.01)

(52) U.S. Cl.
CPC ..... *H04N 1/00381* (2013.01); *H04N 1/00403* (2013.01); *H04N 1/0044* (2013.01); *H04N 1/2376* (2013.01); *H04N 23/611* (2023.01); *G06F 3/017* (2013.01)

(58) Field of Classification Search
CPC ............... H04N 1/0044; H04N 1/2376; H04N 23/60–61; H04N 23/635; G06F 3/017
See application file for complete search history.

(56) References Cited

U.S. PATENT DOCUMENTS

| | | | |
|---|---|---|---|
| 2016/0065839 A1* | 3/2016 | Lee | H04N 23/635 348/262 |
| 2017/0264765 A1* | 9/2017 | Nobutani | H04N 1/442 |
| 2017/0269889 A1* | 9/2017 | Nobutani | G06F 3/167 |
| 2018/0039464 A1 | 2/2018 | Nobutani et al. | |
| 2018/0176397 A1* | 6/2018 | Nishiura | H04N 23/667 |
| 2018/0220018 A1* | 8/2018 | Shinosaki | H04N 1/00419 |
| 2019/0205075 A1 | 7/2019 | Nobutani et al. | |
| 2020/0228707 A1* | 7/2020 | Ueno | H04N 21/4223 |
| 2021/0181605 A1* | 6/2021 | Kurase | H04N 5/2628 |
| 2021/0409553 A1* | 12/2021 | Nagai | G06F 3/0488 |

FOREIGN PATENT DOCUMENTS

| | | |
|---|---|---|
| JP | 2000196934 | 7/2000 |
| JP | 2001145008 | 5/2001 |
| JP | 2002122934 | 4/2002 |
| JP | 2010074400 | 4/2010 |
| JP | 2017169054 | 9/2017 |
| JP | WO2016199483 | 3/2018 |
| JP | 2018094840 | 6/2018 |

OTHER PUBLICATIONS

"Written Opinion of the International Searching Authority (Form PCT/ISA/237) of PCT/JP2020/038540," mailed on Dec. 22, 2020, with English translation thereof, pp. 1-10.
Office Action of Japan Counterpart Application, with English translation thereof, issued on Oct. 24, 2023, pp. 1-8.
"Office Action of China Counterpart Application", issued on Mar. 7, 2024, with partial English translation thereof, p. 1-p. 20.
"Office Action of Japan Counterpart Application", issued on May 7, 2024, with English translation thereof, p. 1-p. 9.
"Office Action of China Counterpart Application", issued on Aug. 31, 2024, with English translation thereof, p. 1-p. 18.
"Office Action of China Counterpart Application", issued on Nov. 16, 2024, with English translation thereof, p. 1-p. 25.
"Decision of Refusal of Japan Counterpart Application", issued on Nov. 12, 2024, with English translation thereof, p. 1-p. 2.

* cited by examiner

FIG. 9
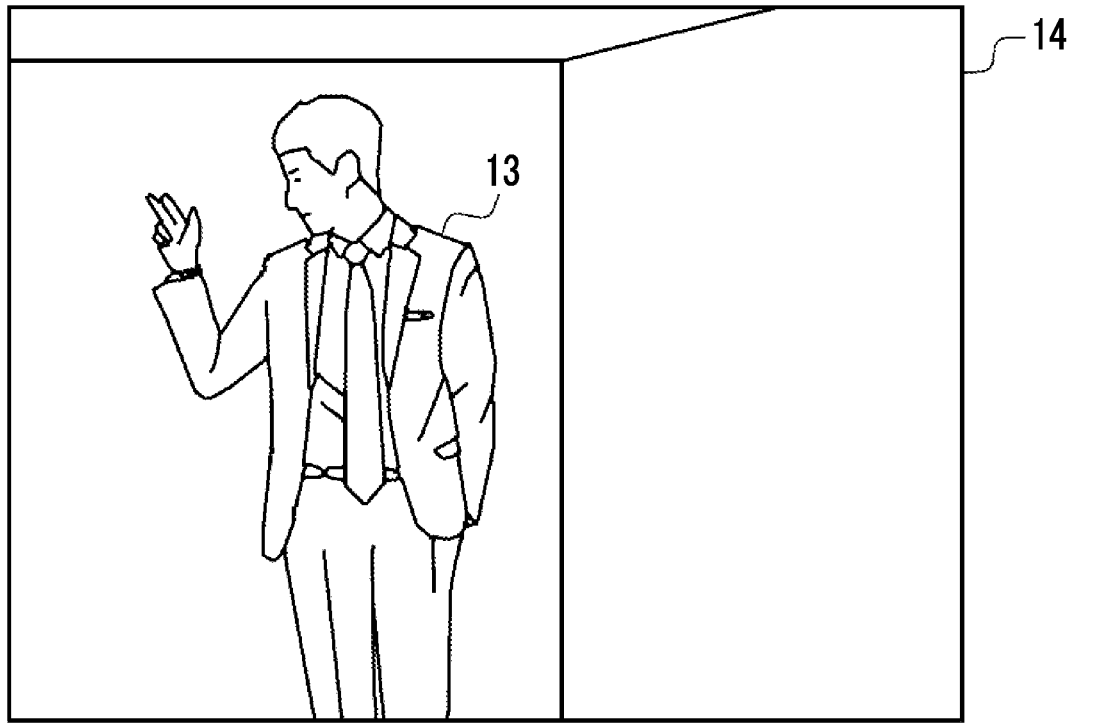
FACE DETECTION, HAND DETECTION
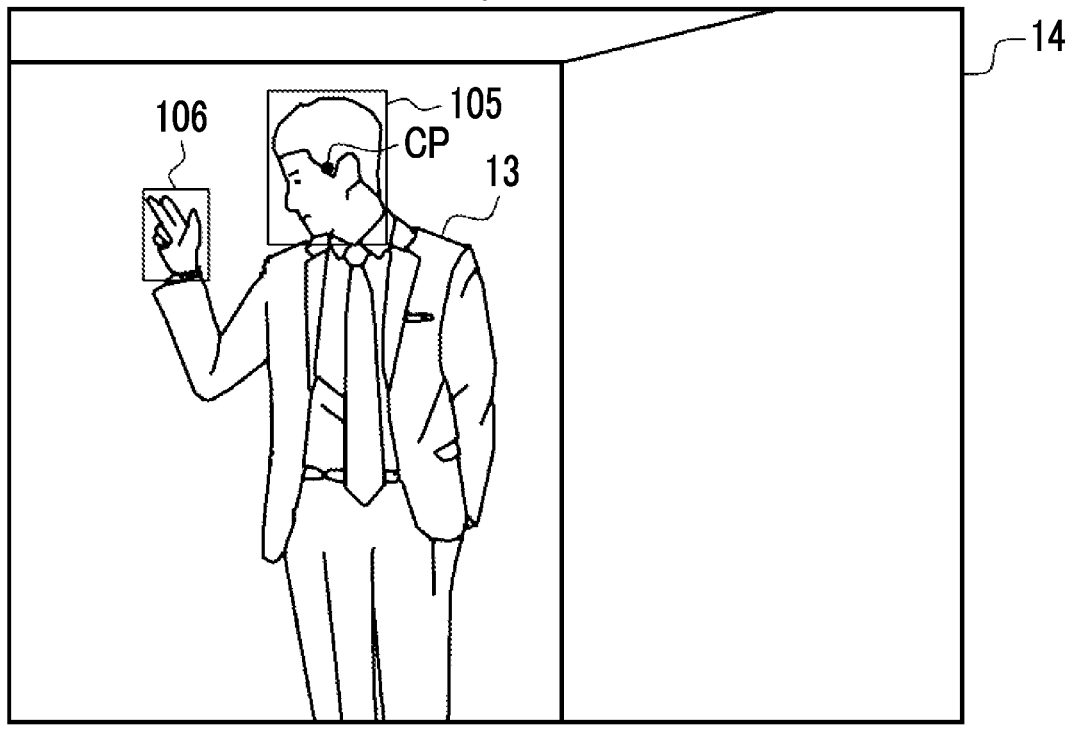

CONTROL DEVICE WITH RECOGNIZING INSTRUCTION FUNCTION OF DIGITAL CAMERA WITH PRINTER, OPERATION METHOD FOR CONTROL DEVICE OF DIGITAL CAMERA WITH PRINTER, AND OPERATION PROGRAM FOR CONTROL DEVICE OF DIGITAL CAMERA WITH PRINTER

CROSS-REFERENCE TO RELATED APPLICATIONS

This application is a continuation application of International Application No. PCT/JP2020/038540 filed on Oct. 12, 2020, the disclosure of which is incorporated herein by reference in its entirety. Further, this application claims priority from Japanese Patent Application No. 2020-034193 filed on Feb. 28, 2020, the disclosure of which is incorporated herein by reference in its entirety.

BACKGROUND

1. Technical Field

The technique of the present disclosure relates to a control device of a digital camera with a printer, an operation method for the control device of the digital camera with the printer, and an operation program for the control device of the digital camera with the printer.

2. Description of the Related Art

JP2002-122934A describes a camera that accepts a specific hand gesture such as a V sign of a person to be imaged as an imaging instruction, instead of a physical imaging instruction such as pressing a release button to capture an image. According to the technique described in JP2002-122934A, the imaging instruction can be issued by a natural gesture, such as the V sign, in a case where so-called self-imaging is performed in which the person to be imaged captures an image of the person to be imaged.

JP2018-094840A describes a digital camera with a printer. The digital camera with the printer has a camera unit that images a subject and sequentially outputs images representing the subject and a printer unit that prints the image captured in response to an imaging instruction on an instant film. Therefore, the captured image can be instantly printed on the instant film by the digital camera with the printer and can be enjoyed.

The digital camera with the printer described in JP2018-094840A displays the captured image as a preview for a certain period of time on a display unit provided in the digital camera with the printer and then prints the image without waiting for a print instruction. That is, the imaging instruction also serves as the print instruction in the digital camera with the printer described in JP2018-094840A.

SUMMARY

A case is considered in which the technique described in JP2002-122934A is applied to the digital camera with the printer described in JP-A-2018-094840. In this case, for example, in a case where the V sign is accepted as the imaging instruction and the print instruction in a case of the self-imaging, usability of the digital camera with the printer can be further improved while the advantage that the captured image can be immediately printed on the instant film remains the same. However, in a case where the technique described in JP2002-122934A is simply applied to the digital camera with the printer described in JP2018-094840A, a failed image to be captured is also printed. For this reason, there is a problem that the instant film may be wasted.

In order to prevent the printing of the failed image to be captured, an aspect is conceivable in which the digital camera with the printer is provided with an operation member that accepts a print stop instruction during the preview display. However, in this aspect, the following problem occurs, for example, in a case where the self-imaging is performed. That is, after the self-imaging ends, the person to be imaged moves to an installation position of the digital camera with the printer and checks the preview display of the display unit of the digital camera with the printer to determine success or failure of the imaging. However, since a considerable amount of time is expected before the success or failure of the imaging is determined, the print stop instruction may not be made in time depending on a preview display time.

Instead of providing the operation member for the print stop instruction in the digital camera with the printer, an aspect is conceivable in which a remote controller for the print stop instruction is given to the person to be imaged. However, the digital camera with the printer is required to be equipped with a function of receiving a signal of the remote controller. In addition, it is not realistic from the viewpoint of cost to prepare a remote controller specialized only for the print stop instruction.

An object of the present disclosure is to provide a control device of a digital camera with a printer, an operation method for the control device of the digital camera with the printer, and an operation program for the control device of the digital camera with the printer, without a risk of wasting a print medium.

A control device of a digital camera with a printer of the present disclosure having a camera unit that images a subject and sequentially outputs images representing the subject and a printer unit that prints the captured image on a print medium in response to an imaging instruction comprises at least one processor. The processor recognizes a first act for an imaging and print instruction that combines the imaging instruction and an instruction to print an image, the first act being performed by a person to be imaged who is included in the subject and within an imaging range of the camera unit, causes the camera unit to perform an imaging operation of outputting an image required to be printed in a case where the first act is recognized, recognizes a second act for an instruction to stop printing the image required to be printed, the second act being performed by the person to be imaged within the imaging range, and causes the printer unit to print the image required to be printed in a case where the second act is not recognized during a predetermined print standby period and instructs the printer unit to stop printing the image required to be printed in a case where the second act is recognized during the print standby period.

It is preferable that the processor performs processing of transferring the image required to be printed from the camera unit to the printer unit during the print standby period.

It is preferable that the processor performs control of displaying the image required to be printed as a preview on a display unit visible to the person to be imaged within the imaging range during the print standby period.

It is preferable that the processor notifies the person to be imaged of an elapsed situation of the print standby period.

It is preferable that the digital camera with the printer can change the imaging range of the camera unit and the processor detects a face of the person to be imaged from the image and performs control of changing the imaging range to set a position of the face to a predetermined set position of the image. It is preferable that the set position is a center position of the image.

It is preferable that the processor notifies the person to be imaged that the first act has been recognized and that the second act has been recognized.

It is preferable that the processor waits until a predetermined imaging standby period elapses after the first act is recognized and then causes the camera unit to perform the imaging operation.

It is preferable that the processor notifies the person to be imaged of an elapsed situation of the imaging standby period.

It is preferable that the processor notifies the person to be imaged of an execution timing of the imaging operation.

It is preferable that the first act and the second act are gestures or uttered voices by the person to be imaged.

It is preferable that the gesture is represented by a hand of the person to be imaged. It is preferable that the first act is a gesture of pointing a palm side toward the digital camera with the printer in a state where an index finger and a middle finger are raised and the other fingers are bent and the second act is a gesture of pointing the palm side toward the digital camera with the printer in a state where all fingers are spread out.

It is preferable that a partial region of the image is used as a print region of the printer unit and the processor performs control of displaying the print region on the image.

It is preferable that the processor performs control of displaying a remaining number of sheets of the print medium.

The print medium is an instant film.

An operation method for a control device of a digital camera with a printer of the present disclosure having a camera unit that images a subject and sequentially outputs images representing the subject and a printer unit that prints the captured image on a print medium in response to an imaging instruction comprises a first recognition step of recognizing a first act for an imaging and print instruction that combines the imaging instruction and an instruction to print an image, the first act being performed by a person to be imaged who is included in the subject and within an imaging range of the camera unit, an imaging control step of causing the camera unit to perform an imaging operation of outputting an image required to be printed in a case where the first act is recognized, a second recognition step of recognizing a second act for an instruction to stop printing the image required to be printed, the second act being performed by the person to be imaged within the imaging range, and a print control step of causing the printer unit to print the image required to be printed in a case where the second act is not recognized during a predetermined print standby period and instructing the printer unit to stop printing the image required to be printed in a case where the second act is recognized during the print standby period.

An operation program for a control device of a digital camera with a printer of the present disclosure having a camera unit that images a subject and sequentially outputs images representing the subject and a printer unit that prints the captured image on a print medium in response to an imaging instruction causes a computer to function as a first recognition unit that recognizes a first act for an imaging and print instruction that combines the imaging instruction and an instruction to print an image, the first act being performed by a person to be imaged who is included in the subject and within an imaging range of the camera unit, an imaging control unit that causes the camera unit to perform an imaging operation of outputting an image required to be printed in a case where the first act is recognized, a second recognition unit that recognizes a second act for an instruction to stop printing the image required to be printed, the second act being performed by the person to be imaged within the imaging range, and a print control unit that causes the printer unit to print the image required to be printed in a case where the second act is not recognized during a predetermined print standby period and instructs the printer unit to stop printing the image required to be printed in a case where the second act is recognized during the print standby period.

According to the technique of the present disclosure, it is possible to provide the control device of the digital camera with the printer, the operation method for the control device of the digital camera with the printer, and the operation program for the control device of the digital camera with the printer, without a risk of wasting the print medium.

BRIEF DESCRIPTION OF THE DRAWINGS

Exemplary embodiments according to the technique of the present disclosure will be described in detail based on the following figures, wherein:

FIG. 9 is a diagram showing processing of a face detection unit and a hand detection unit;

DETAILED DESCRIPTION

Figure 1:
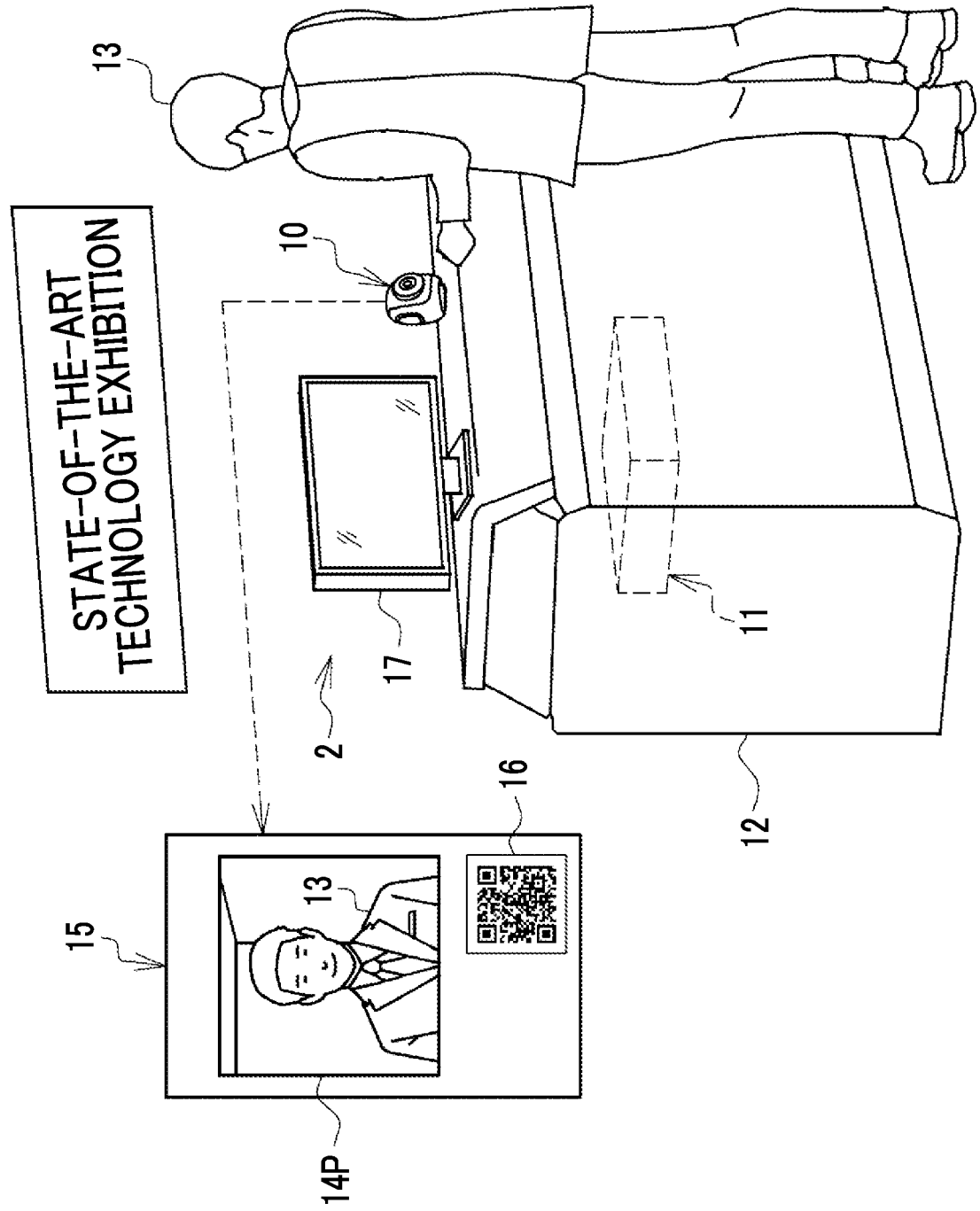
FIG. 1 is a diagram showing an imaging system.

In FIG. 1, an imaging system 2 comprises a digital camera with a printer 10 and a control device 11 and is installed, for example, at an exhibition reception counter 12. The digital camera with the printer 10 is disposed on the reception counter 12. The digital camera with the printer 10 images a face of a participant 13 of the exhibition who visits the reception counter 12 and prints an image 14P obtained by imaging the face on an instant film 15. The participant 13 is an example of "person to be imaged" according to the technique of the present disclosure. The image 14P is an example of "image required to be printed" according to the technique of the present disclosure. Further, the instant film 15 is an example of "print medium" according to the technique of the present disclosure.

A two-dimensional code 16 is printed on the instant film 15 in addition to the image 14P. An entrance pass to the exhibition is registered in the two-dimensional code 16. The participant 13 receives the instant film 15 and holds the two-dimensional code 16 over a code reader of a reception gate (not shown) to enter the exhibition. That is, the instant film 15 serves as an admission ticket for the exhibition.

The control device 11 is connected to the digital camera with the printer 10. The control device 11 is, for example, a desktop personal computer, and a main body of the control device is disposed in the reception counter 12. The control device 11 has a display 17. The display 17 is disposed on the reception counter 12 and next to the digital camera with the printer 10. The display 17 is directed at the participant 13. The control device 11 displays an image (live view image) 14 (refer to FIG. 2), which is sequentially output from the digital camera with the printer 10, in a live view on the display 17 or displays the image 14P to be printed on the instant film 15 as a preview on the display 17 before printing. The display 17 is an example of "display unit" according to the technique of the present disclosure.

Figure 2:
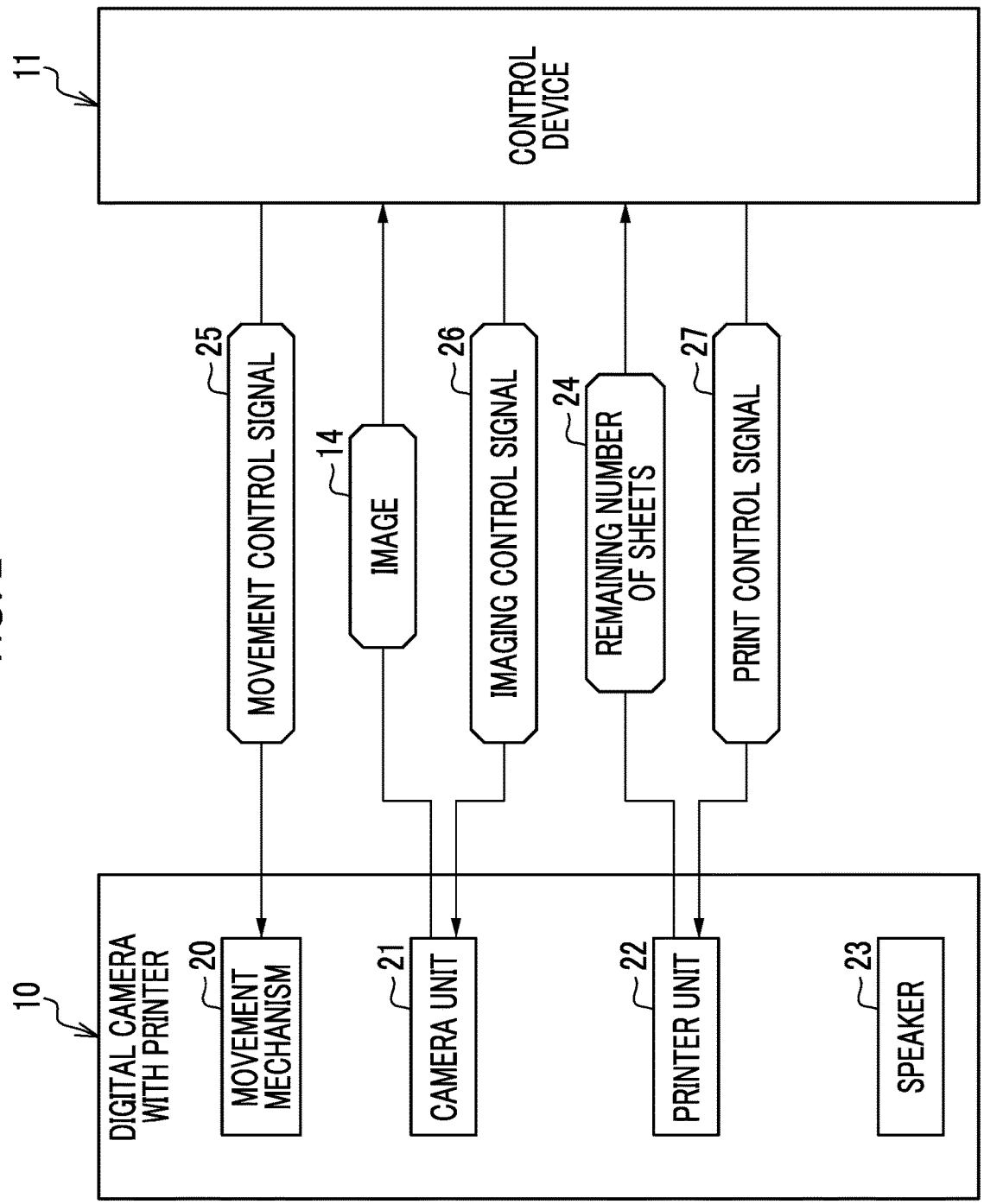
FIG. 2 is a diagram showing information transmitted and received between a digital camera with a printer and a control device.

In FIG. 2, the digital camera with the printer 10 has a movement mechanism 20, a camera unit 21, a printer unit 22, and a speaker 23. The movement mechanism 20 moves the digital camera with the printer 10. With this movement mechanism 20, the digital camera with the printer 10 can change an imaging range 110 (refer to FIG. 10) of the camera unit 21.

The camera unit 21 images a subject (including participant 13, background wall, and the like) shown in the imaging range 110 and sequentially outputs the image 14 representing the subject. The image 14 output from the camera unit 21 is transmitted to the control device 11. The printer unit 22 prints the image 14P on the instant film 15. The printer unit 22 decrements the number of sheets of the instant film 15 each time the printing ends to count a remaining number of sheets 24 of the instant film 15. The remaining number of sheets 24 counted by the printer unit 22 is transmitted to the control device 11. The speaker 23 outputs various guide voices that guide the participant 13 to a procedure of imaging and printing the image 14P.

The control device 11 transmits a movement control signal 25, an imaging control signal 26, and a print control signal 27 to the digital camera with the printer 10. The movement control signal 25 is a signal for controlling the operation of the movement mechanism 20. The imaging control signal 26 is a signal for controlling the operation of the camera unit 21. The print control signal 27 is a signal for controlling the operation of the printer unit 22.

Figure 3:
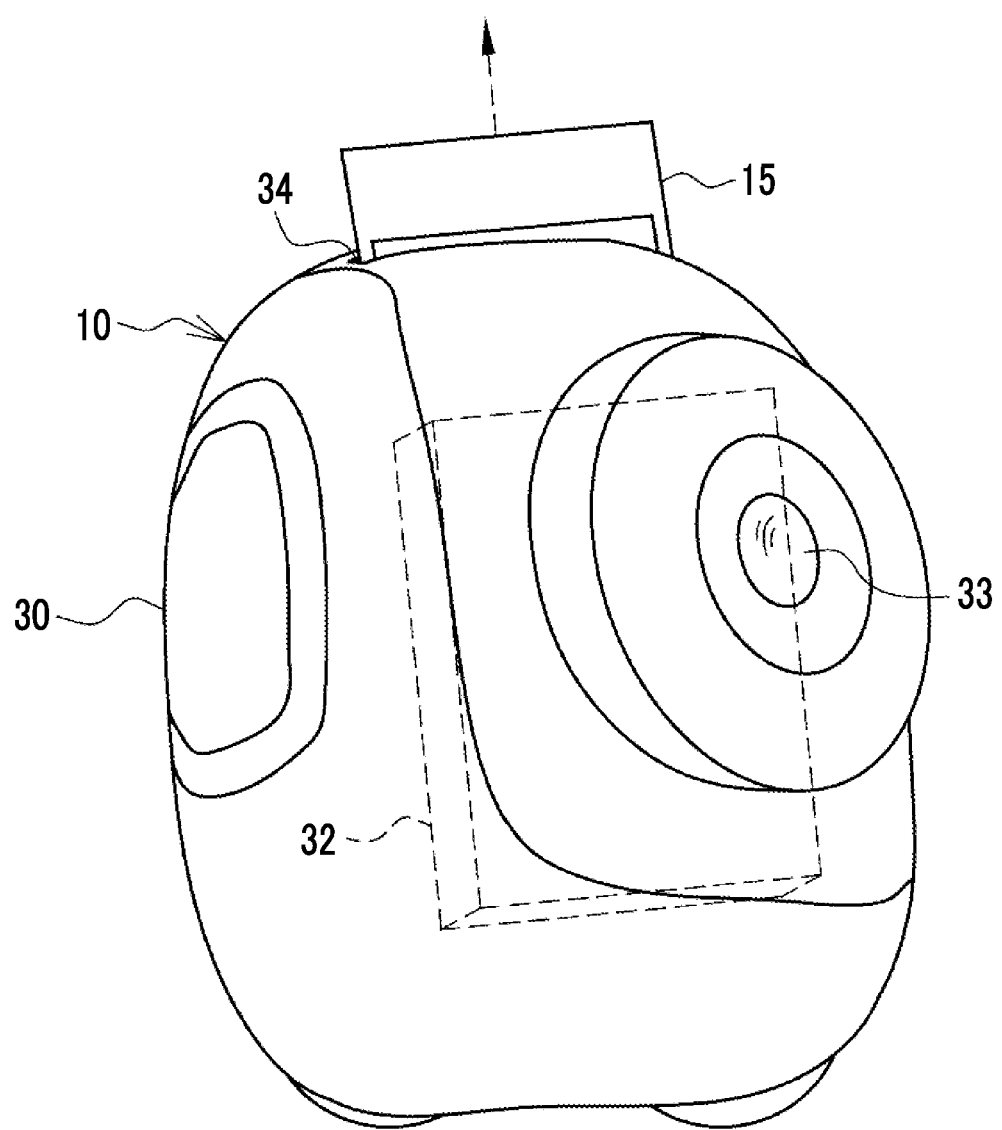
FIG. 3 is a front perspective view of the digital camera with the printer.
Figure 4:
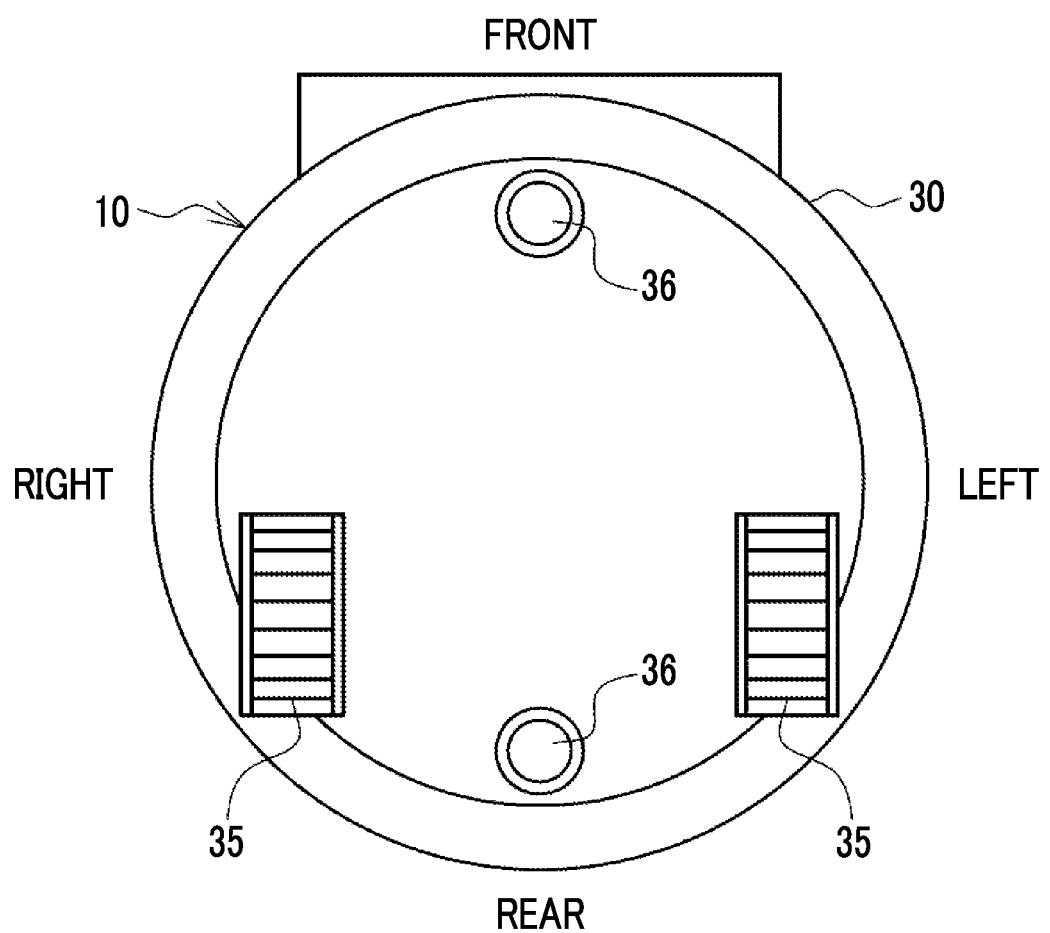
FIG. 4 is a view of the digital camera with the printer as viewed from below.

As shown in FIGS. 3 and 4, the digital camera with the printer 10 has a main body 30. The main body 30 has a rounded box shape as a whole, and a film pack 32 of the instant film 15 is interchangeably loaded inside of the main body. The film pack 32 contains a plurality of unused sheets of the instant film 15, for example, 10 sheets.

An imaging lens 33 that captures subject light is disposed in a front of the main body 30. The imaging lens 33 is a single focus lens. A discharge port 34 is formed on an upper part of the main body 30. The instant film 15 on which the image 14P is printed is discharged from the discharge port 34. In the following description, a side to which the imaging lens 33 is disposed is defined as the front of the main body 30.

A pair of wheels 35 and two support balls 36 are attached to a bottom surface of the main body 30. The wheels 35 are disposed at left and right symmetrical positions on a rear part side of the main body 30. The support balls 36 are disposed at front and rear symmetrical positions. The wheels 35 rotate front and rear, and the support balls 36 rotate in accordance with the rotation of the wheels 35. The wheels 35 are steering wheels. The rotation of the wheels 35 and the support balls 36 causes the main body 30 to move front and rear and left and right.

Figure 5:
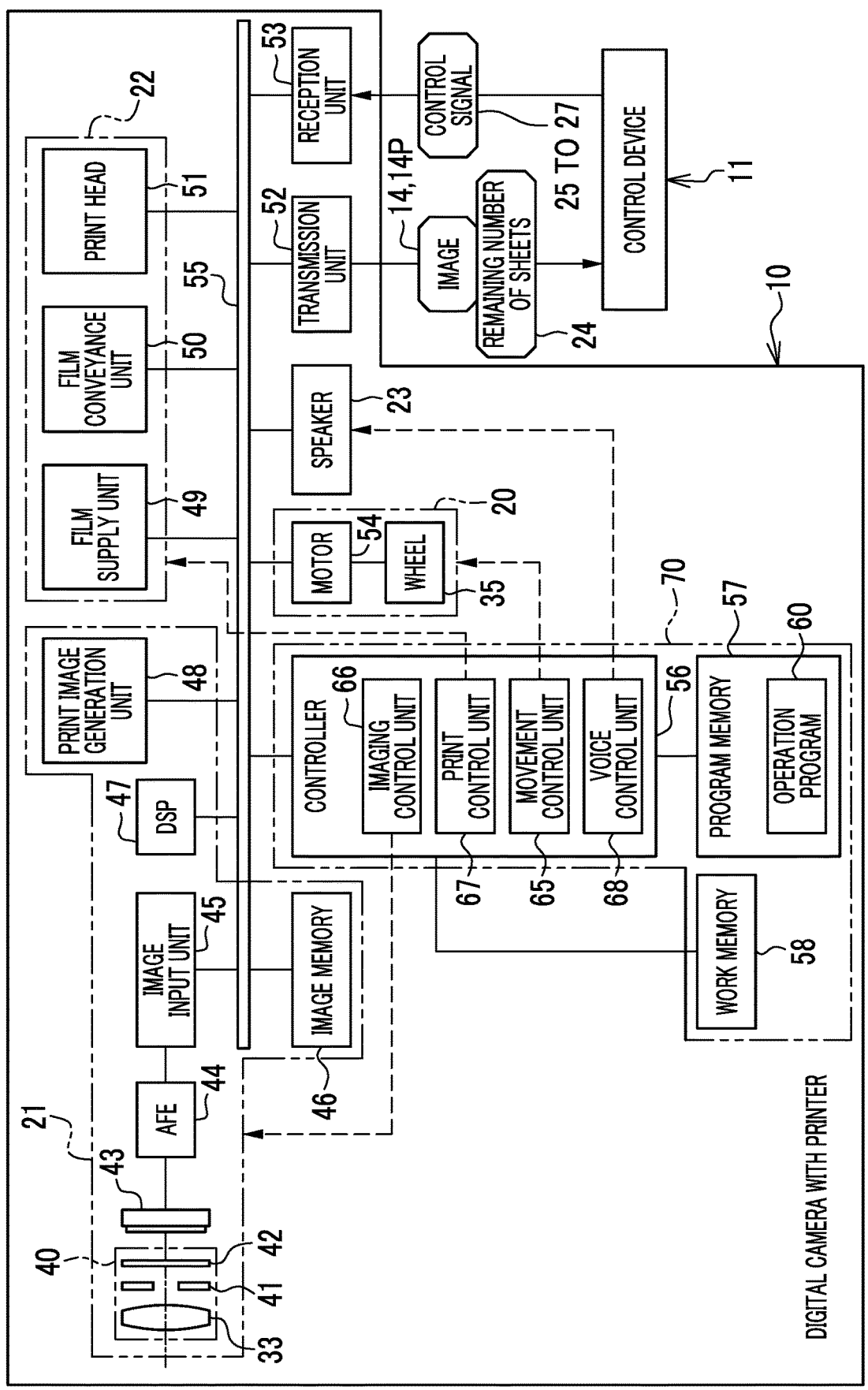
FIG. 5 is a block diagram of the digital camera with the printer.

As shown in FIG. 5, the digital camera with the printer 10 has an imaging optical system 40. The imaging optical system 40 is configured of the above-mentioned imaging lens 33, a stop 41, and a shutter 42. The stop 41 adjusts an amount of the subject light that has passed through the imaging lens 33. The shutter 42 blocks the subject light that has passed through the imaging lens 33.

An imaging element 43 is disposed at a post stage of the imaging optical system 40. As is well known, the imaging element 43 has a configuration in which a plurality of pixels that photoelectrically convert the subject light and convert the subject light into an analog electric signal are disposed on an imaging surface. The imaging element 43 is, for example, a charge-coupled device (CCD) image sensor or a complementary metal-oxide semiconductor (CMOS) image sensor.

An analog signal processing unit (hereinafter abbreviated as analog front end (AFE)) 44 is connected to the imaging element 43. The imaging element 43 outputs the analog electric signal obtained by photoelectrically converting the subject light to the AFE 44 according to a predetermined frame rate. The AFE 44 performs various kinds of analog signal processing such as sampling two correlation pile processing and amplification processing on the analog electric signal and then performs analog-to-digital (A/D) conversion processing that converts the analog electric signal into a digital electric signal. In a case where the imaging element 43 is the CMOS image sensor, the AFE 44 is built in the imaging element 43.

The digital camera with the printer 10 comprises an image input unit 45, an image memory 46, a digital signal processing unit (hereinafter abbreviated as digital signal processor (DSP)) 47, a print image generation unit 48, a film supply unit 49, a film conveyance unit 50, a print head 51, a transmission unit 52, a reception unit 53, a motor 54, and the like. The image input unit 45, the image memory 46, the DSP 47, the print image generation unit 48, the film supply unit 49, the film conveyance unit 50, the print head 51, the transmission unit 52, the reception unit 53, the motor 54, and the like are connected to a controller 56 via a bus line 55. The speaker 23 described above is also connected to the bus line 55.

The image input unit 45 captures the digital electric signal from the AFE 44 as the image 14. The image input unit 45 stores the captured image 14 in the image memory 46. The image memory 46 can store images 14 for a plurality of frames.

The DSP 47 reads out the image 14 from the image memory 46. The DSP 47 performs, on the readout image 14, various kinds of digital signal processing such as defect pixel correction processing, offset correction processing, gain correction processing, linear matrix processing, white balance correction processing, gamma correction processing, demosaic processing, and YC (Y is brightness and C is color difference) conversion processing. The DSP 47 stores the processed image 14 in the image memory 46 and outputs the processed image to the transmission unit 52. The transmission unit 52 transmits the image 14 to the control device 11.

The print image generation unit 48 generates the image 14P from the processed image 14 stored in the image memory 46. The print image generation unit 48 stores the generated image 14P in the image memory 46 and outputs the generated image to the transmission unit 52. The transmission unit 52 transmits the image 14P to the control device 11. The imaging optical system 40, the imaging element 43, the AFE 44, the image input unit 45, the image memory 46, the DSP 47, and the print image generation unit 48 constitute the camera unit 21.

The film supply unit 49 sends out one sheet of the instant film 15 from the film pack 32 and supplies the sent instant film 15 to the print head 51. The film conveyance unit 50 conveys one sheet of the instant film 15 sent from the film pack 32 by the film supply unit 49 toward the discharge port 34.

The print head 51 prints the image 14P on the instant film 15. The print head 51 is configured of, for example, a line-type exposure head. The print head 51 reads out the image 14P from the image memory 46. The print head 51 records the image 14P line by line on the instant film 15 conveyed by the film conveyance unit 50. The film supply unit 49, the film conveyance unit 50, and the print head 51 constitute the printer unit 22.

The printer unit 22 outputs the remaining number of sheets 24 to the transmission unit 52 each time the instant film 15 is consumed for the printing of the image 14P. The transmission unit 52 transmits the remaining number of sheets 24 to the control device 11.

The reception unit 53 receives the movement control signal 25, the imaging control signal 26, and the print control signal 27. The reception unit 53 outputs the received movement control signal 25, imaging control signal 26, and print control signal 27 to the controller 56.

The motor 54 rotates the wheels 35 front and rear and left and right. The motor 54 and the wheels 35 constitute the movement mechanism 20.

The controller 56 is, for example, a micro-processing unit (MPU) and controls the entire operation of the digital camera with the printer 10. A program memory 57 and a work memory 58 are connected to the controller 56. An operation program 60 is stored in the program memory 57. The operation program 60 is an example of "operation program for control device of digital camera with printer" according to the technique of the present disclosure.

The work memory 58 is a memory for work for the controller 56 to execute processing. The controller 56 loads the operation program 60 stored in the program memory 57 into the work memory 58 and executes the processing according to the operation program 60. Accordingly, the controller 56 functions as a movement control unit 65, an imaging control unit 66, a print control unit 67, and a voice control unit 68. That is, the controller 56 is an example of "processor" according to the technique of the present disclosure. Further, a computer 70 configured of the controller 56, the program memory 57, and the work memory 58 is an example of "control device of digital camera with printer" according to the technique of the present disclosure.

The movement control unit 65 controls the operation of the movement mechanism 20, specifically, the motor 54, based on the movement control signal 25 from the control device 11. The imaging control unit 66 controls the operation of the camera unit 21 based on the imaging control signal 26 from the control device 11. Specifically, the imaging control signal 26 represents an instruction to image the image 14P, and the imaging control unit 66 causes, in a case where the imaging control signal 26 is received, the camera unit 21 to perform an imaging operation of outputting the image 14P.

The print control unit 67 controls the operation of the printer unit 22 based on the print control signal 27 from the control device 11. The print control signal 27 includes a signal representing an instruction to print the image 14P and a signal representing an instruction to stop printing the image 14P. The print control unit 67 causes, in a case where the print control signal 27 representing the instruction to print the image 14P is received, the printer unit 22 to print the image 14P. On the contrary, in a case where the print control signal 27 representing the instruction to stop printing the image 14P is received, the print control unit 67 instructs the printer unit 22 to stop printing the image 14P. The voice control unit 68 controls the operation of the speaker 23.

Figure 6:
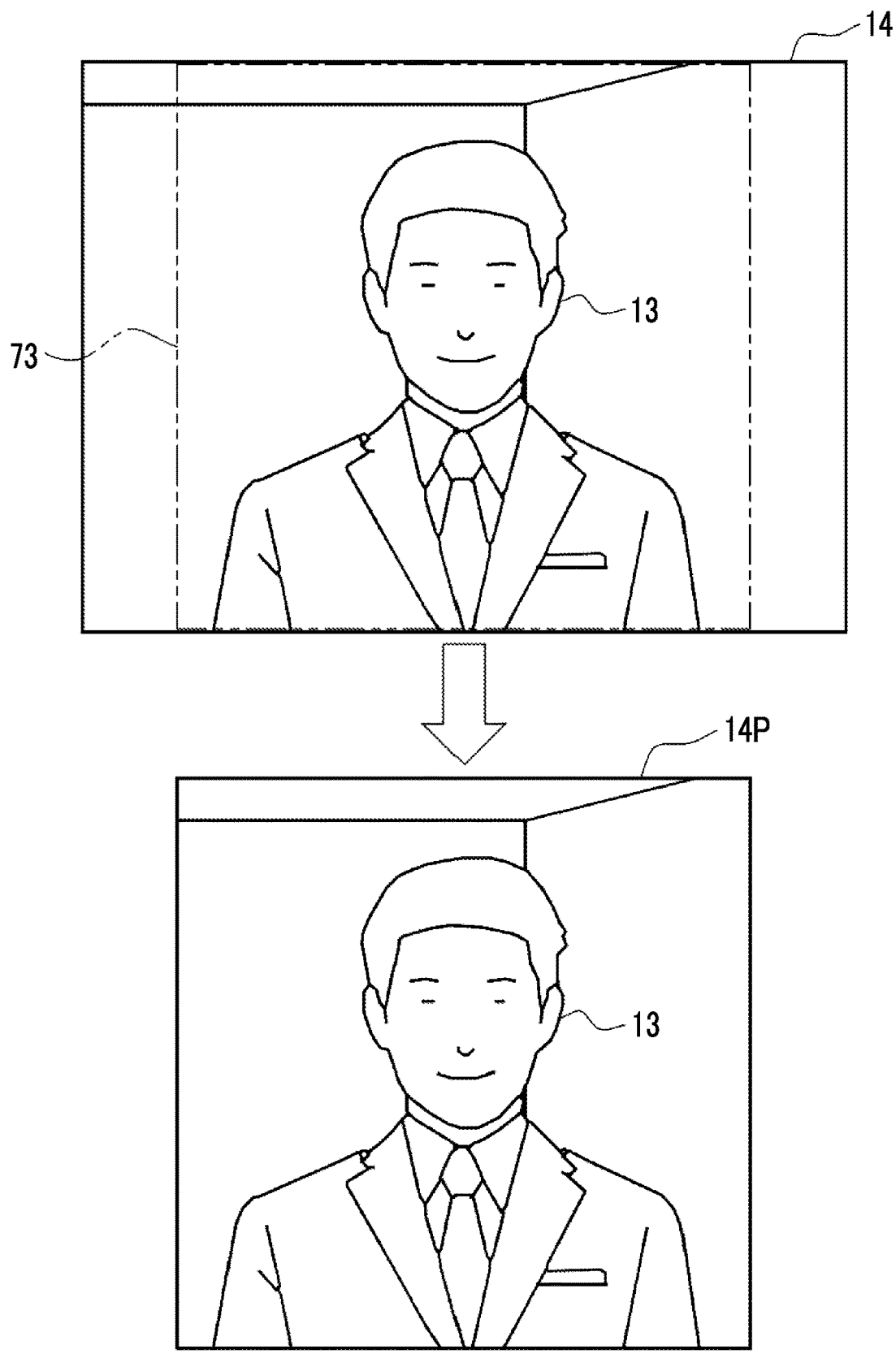
FIG. 6 is a diagram showing processing of a print image generation unit.

As shown in FIG. 6, the image 14 has a rectangular shape with an aspect ratio of, for example, 4:3. A partial region of the image 14 is a print region 73 of the printer unit 22. The print region 73 has a square shape with an aspect ratio of 1:1. A length of a side of the print region 73 matches a length of a short side of the image 14, and a center of the print region 73 matches a center of the image 14. The print image generation unit 48 cuts out the print region 73 from the processed image 14 stored in the image memory 46 to generate the image 14P. Therefore, the image 14P is an image excluding regions at both left and right ends of the image 14.

Figure 7:
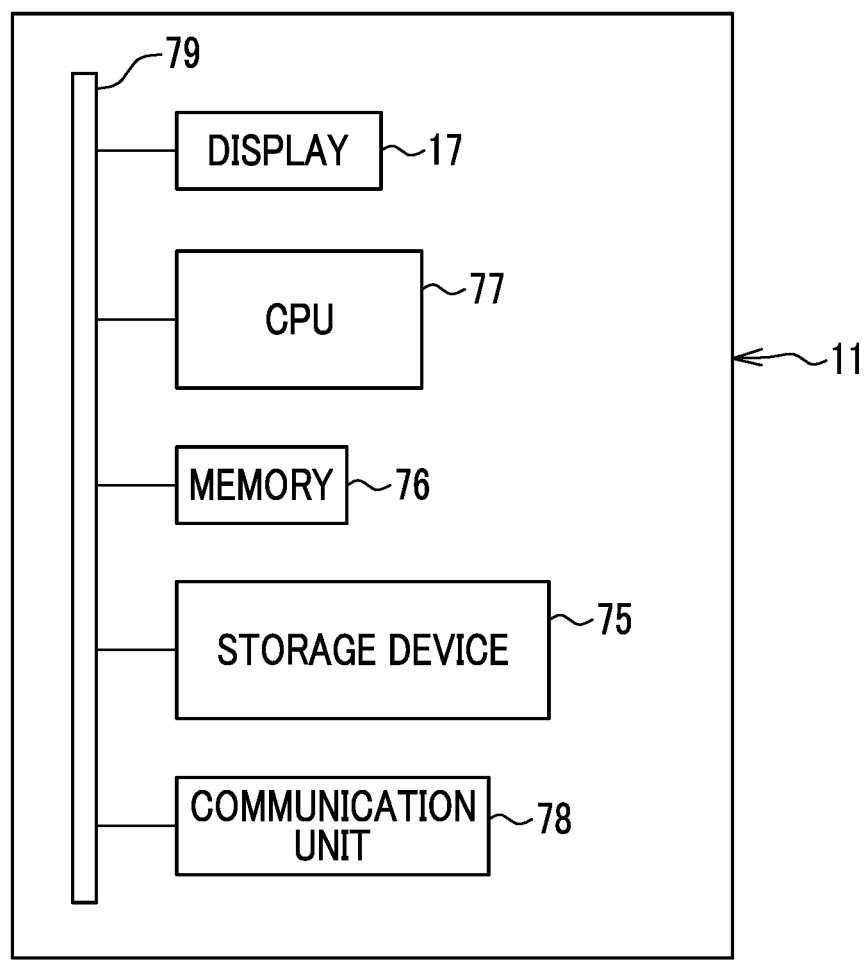
FIG. 7 is a block diagram showing a computer constituting the control device.

In FIG. 7, the computer constituting the control device 11 comprises a storage device 75, a memory 76, a central processing unit (CPU) 77, and a communication unit 78 in addition to the display 17 described above. The above parts are interconnected through a bus line 79.

The storage device 75 is, for example, a hard disk drive or a solid state drive built in the computer constituting the control device 11. The storage device 75 stores a control program such as an operating system, various application programs, and various kinds of data and the like accompanied by these programs.

The memory 76 is a memory for work for the CPU 77 to execute processing. The CPU 77 loads the program stored in the storage device 75 into the memory 76 and executes the processing according to the program to integrally control the respective components of the computer. The communication unit 78 is an interface that controls transmission of various kinds of information with the digital camera with the printer 10 and the like.

Figure 8:
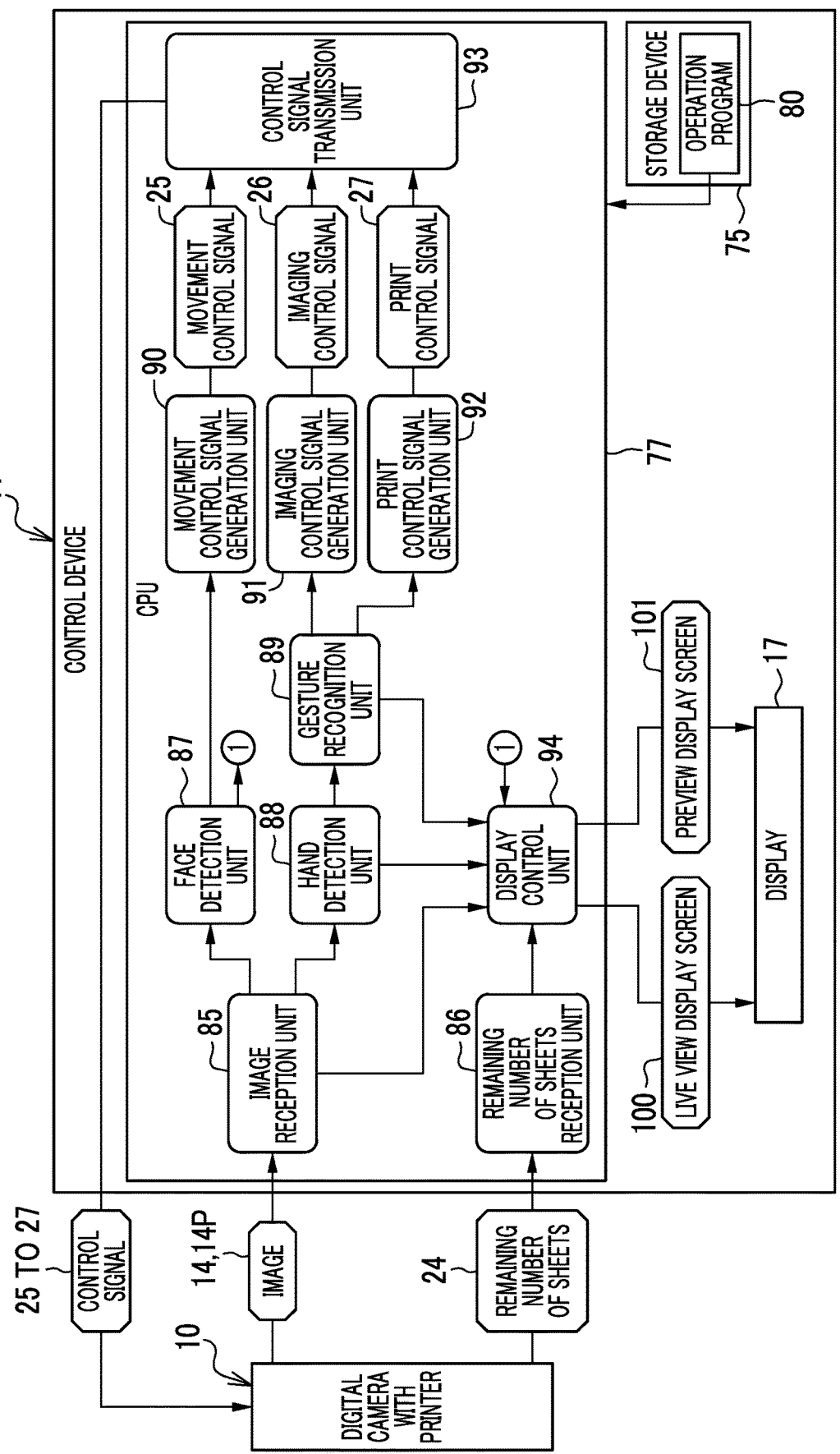
FIG. 8 is a block diagram of the control device.

In FIG. 8, the storage device 75 stores an operation program 80. The operation program 80 is a program causing the computer constituting the control device 11 to operate as "control device of digital camera with printer" according to the technique of the present disclosure. That is, the operation program 80 is an example of "operation program for control device of digital camera with printer" according to the technique of the present disclosure, like the operation program 60. Further, the control device 11 is an example of "control device of digital camera with printer" according to the technique of the present disclosure.

In a case where the operation program 80 is activated, the CPU 77 of the control device 11 cooperates with the memory 76 and the like to function as an image reception unit 85, a remaining number of sheets reception unit 86, a face detection unit 87, a hand detection unit 88, a gesture recognition unit 89, a movement control signal generation unit 90, an imaging control signal generation unit 91, a print control signal generation unit 92, a control signal transmission unit 93, and a display control unit 94. The CPU 77 is an example of "processor" according to the technique of the present disclosure.

The image reception unit 85 receives the images 14 and 14P from the digital camera with the printer 10. The image reception unit 85 outputs the received image 14 to the face detection unit 87, the hand detection unit 88, and the display control unit 94. Further, the image reception unit 85 outputs the received image 14P to the display control unit 94.

The remaining number of sheets reception unit 86 receives the remaining number of sheets 24 from the digital camera with the printer 10. The remaining number of sheets reception unit 86 outputs the received remaining number of sheets 24 to the display control unit 94.

The face detection unit 87 detects the face of the participant 13 from the image 14 by using a well-known image recognition technique such as a machine learning model for object detection such as single shot multibox detector (SSD). The face detection unit 87 outputs a face detection result to the movement control signal generation unit 90 and the display control unit 94.

Similarly to the face detection unit 87, the hand detection unit 88 detects a hand of the participant 13 from the image 14 by using a well-known image recognition technique such as a machine learning model for object detection such as SSD. The hand detection unit 88 outputs a hand detection result to the gesture recognition unit 89 and the display control unit 94.

The gesture recognition unit 89 recognizes the gesture represented by the hand of the participant 13 based on the hand detection result from the hand detection unit 88. The gesture recognition unit 89 outputs the gesture recognition result to the imaging control signal generation unit 91, the print control signal generation unit 92, and the display control unit 94. The gesture recognition unit 89 is examples of "first recognition unit" and "second recognition unit" according to the technique of the present disclosure.

The movement control signal generation unit 90 generates the movement control signal 25 based on the face detection result from the face detection unit 87. The movement control signal generation unit 90 outputs the movement control signal 25 to the control signal transmission unit 93.

The imaging control signal generation unit 91 generates the imaging control signal 26 based on the gesture recognition result from the gesture recognition unit 89. The imaging control signal generation unit 91 outputs the imaging control signal 26 to the control signal transmission unit 93.

The print control signal generation unit 92 generates the print control signal 27 based on the gesture recognition result from the gesture recognition unit 89. The print control signal generation unit 92 outputs the print control signal 27 to the control signal transmission unit 93.

The control signal transmission unit 93 transmits the movement control signal 25, the imaging control signal 26, and the print control signal 27 to the digital camera with the printer 10.

The display control unit 94 controls the display of various screens on the display 17. Various screens include a live view display screen 100 (refer to FIG. 16 and the like) for displaying the image 14 in a live view and a preview display screen 101 (refer to FIG. 25 and the like) for displaying the image 14P as a preview before the printing.

As shown in FIG. 9, the face detection unit 87 outputs position information of a rectangular region (hereinafter referred to as face detection region) 105 surrounding the face of the participant 13 as the face detection result. The position information of the face detection region 105 is, for example, position coordinates of a center CP of the face detection region 105. Further, the hand detection unit 88 outputs a rectangular region (hereinafter referred to as hand detection region) 106 surrounding the hand of the participant 13 as the hand detection result.

Figure 10:
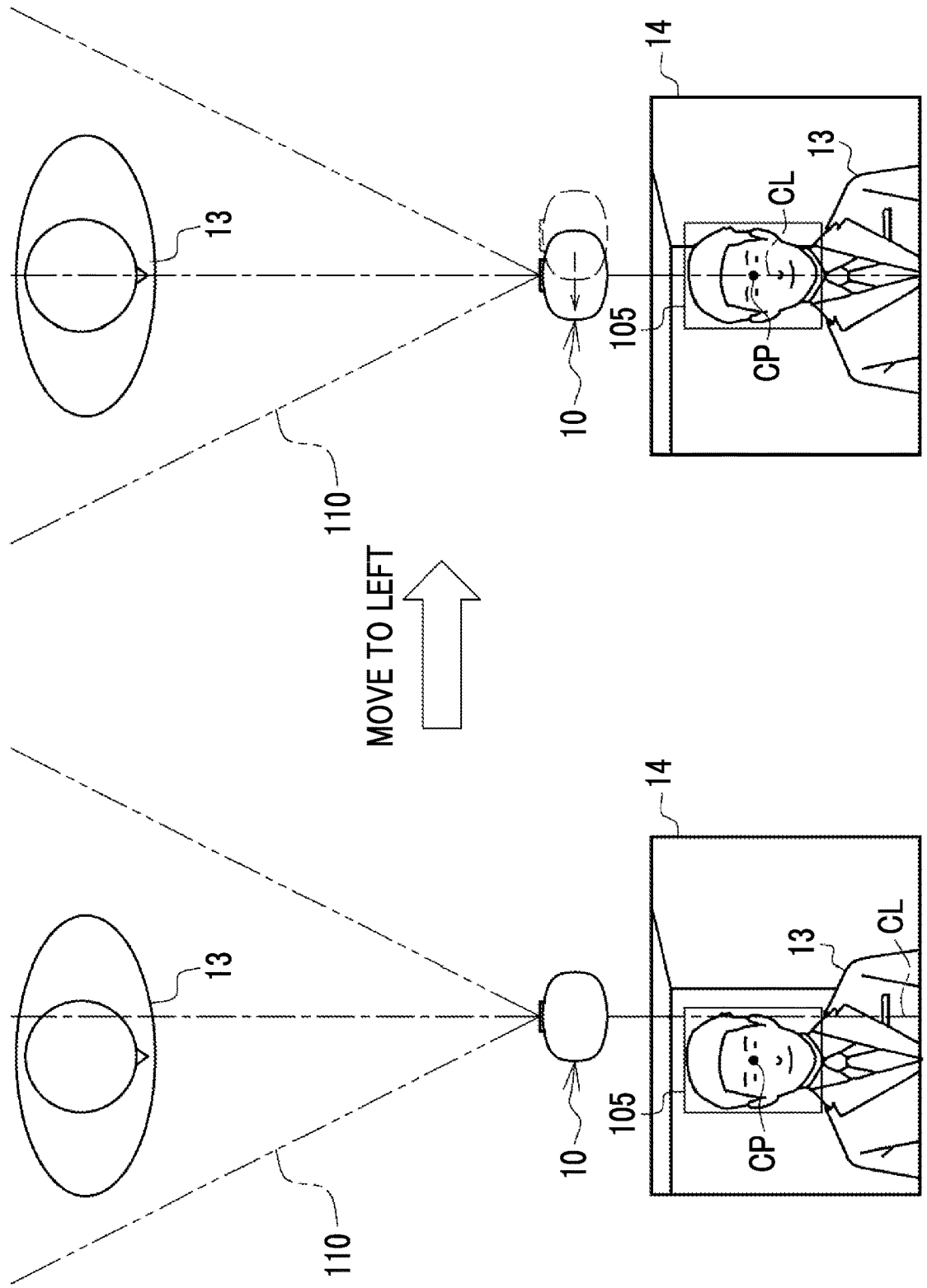
FIG. 10 is a diagram showing a state where an imaging range of a camera unit is changed to set a face position to a center position of an image.

As shown on a left side of an arrow in FIG. 10, in a case where the center CP of the face detection region 105 deviates from a center line CL of a long side of the image 14, the movement control signal generation unit 90 generates the movement control signal 25 for matching the center CP and the center line CL. In response to the movement control signal 25, the movement control unit 65 operates the movement mechanism 20 to move the digital camera with the printer 10 such that the center CP matches the center line CL as shown on a right side of the arrow. That is, with the change of the imaging range 110 of the camera unit 21, the movement control unit 65 sets the position of the face of the participant 13 to the center position of the image 14.

FIG. 10 shows an example in which the center CP of the face detection region 105 deviates to a left side with respect to the center line CL of the image 14 and the digital camera with the printer 10 is moved to the left in order to match the center and the center line. The center line CL is an example of "set position" and "center position of image" according to the technique of the present disclosure.

The movement control signal generation unit 90 generates the movement control signal 25 in a case where the participant 13 stands at a predetermined imaging position and the face detection region 105 has a predetermined set size. The imaging position is indicated by, for example, a foot-shaped sheet laid in front of the reception counter 12.

Figure 11:
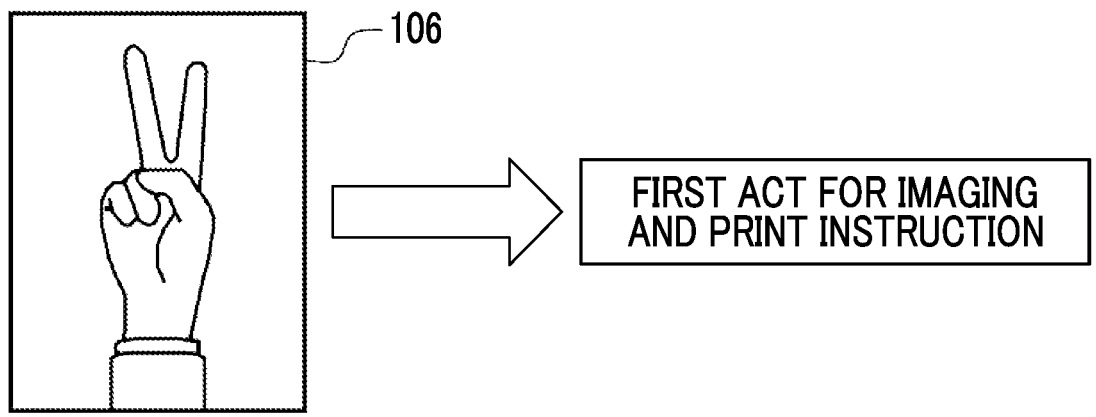
FIG. 11 is a diagram showing a gesture recognized as a first act.

As shown in FIG. 11, the gesture recognition unit 89 recognizes, as a first act for an imaging and print instruction that combines the instruction to image the image 14P and the instruction to stop the printing of the image 14P, a gesture of pointing a palm side toward the digital camera with the printer 10 in a state where an index finger and a middle finger are raised and the other fingers are bent. In a case where the recognition result that the first act has been recognized is received from the gesture recognition unit 89, the imaging control signal generation unit 91 generates the imaging control signal 26 representing the instruction to image the image 14P. Further, in a case where the recognition result that the first act has been recognized is received from the gesture recognition unit 89, the print control signal generation unit 92 generates the print control signal 27 representing the print instruction of the image 14P. In the following, the gesture of pointing the palm side toward the digital camera with the printer 10 in a state where the index finger and the middle finger are raised and the other fingers are bent is referred to as a V sign.

Figure 12:
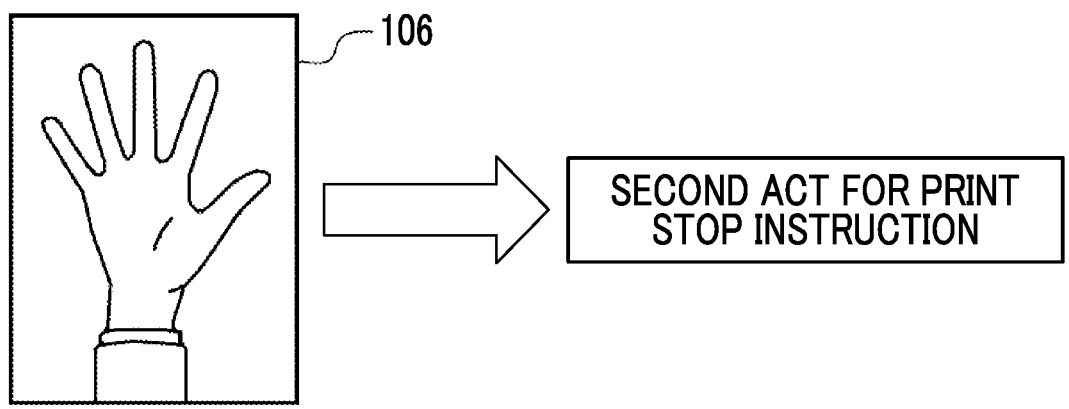
FIG. 12 is a diagram showing a gesture recognized as a second act.

Further, as shown in FIG. 12, the gesture recognition unit 89 recognizes, as a second act for the instruction to stop printing the image 14P, a gesture of pointing the palm side toward the digital camera with the printer 10 in a state where all fingers are spread out. In a case where the recognition result that the second act has been recognized is received from the gesture recognition unit 89, the print control signal generation unit 92 generates the print control signal 27 representing the instruction to stop printing the image 14P. In the following, the gesture of pointing the palm side toward the digital camera with the printer 10 in a state where all fingers are spread out is referred to as a stop sign. Although both FIGS. 11 and 12 show the right hand, the left hand may be used.

Figure 13:
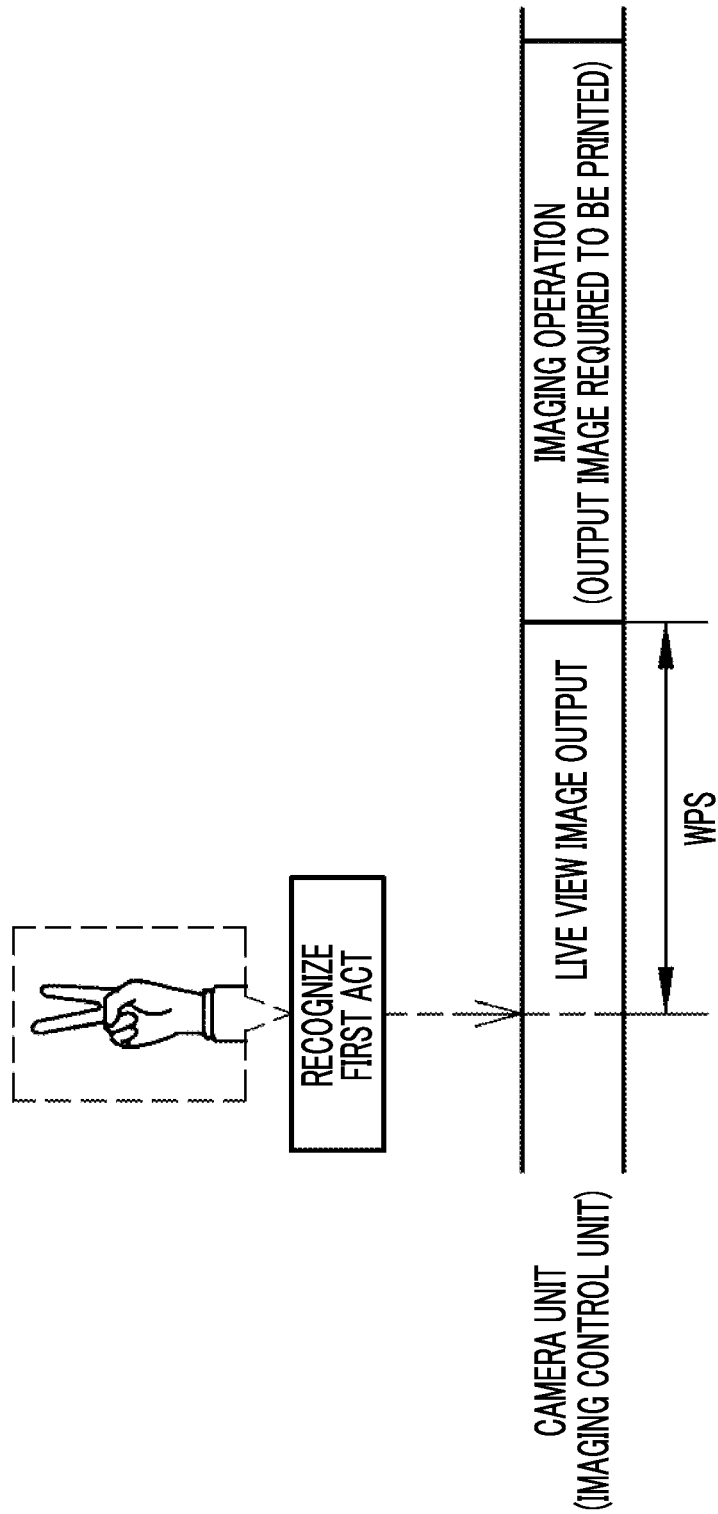
FIG. 13 is a diagram showing a transition of an operation of the camera unit after the first act is recognized.

As shown in FIG. 13, the imaging control unit 66 waits until a predetermined imaging standby period WPS elapses after recognizing the first act and then causes the camera unit 21 to perform the imaging operation. The imaging control unit 66 causes the camera unit 21 to output the image (live view image for live view display) 14 during the imaging standby period WPS. The imaging standby period WPS is, for example, 3 seconds.

Figure 14:
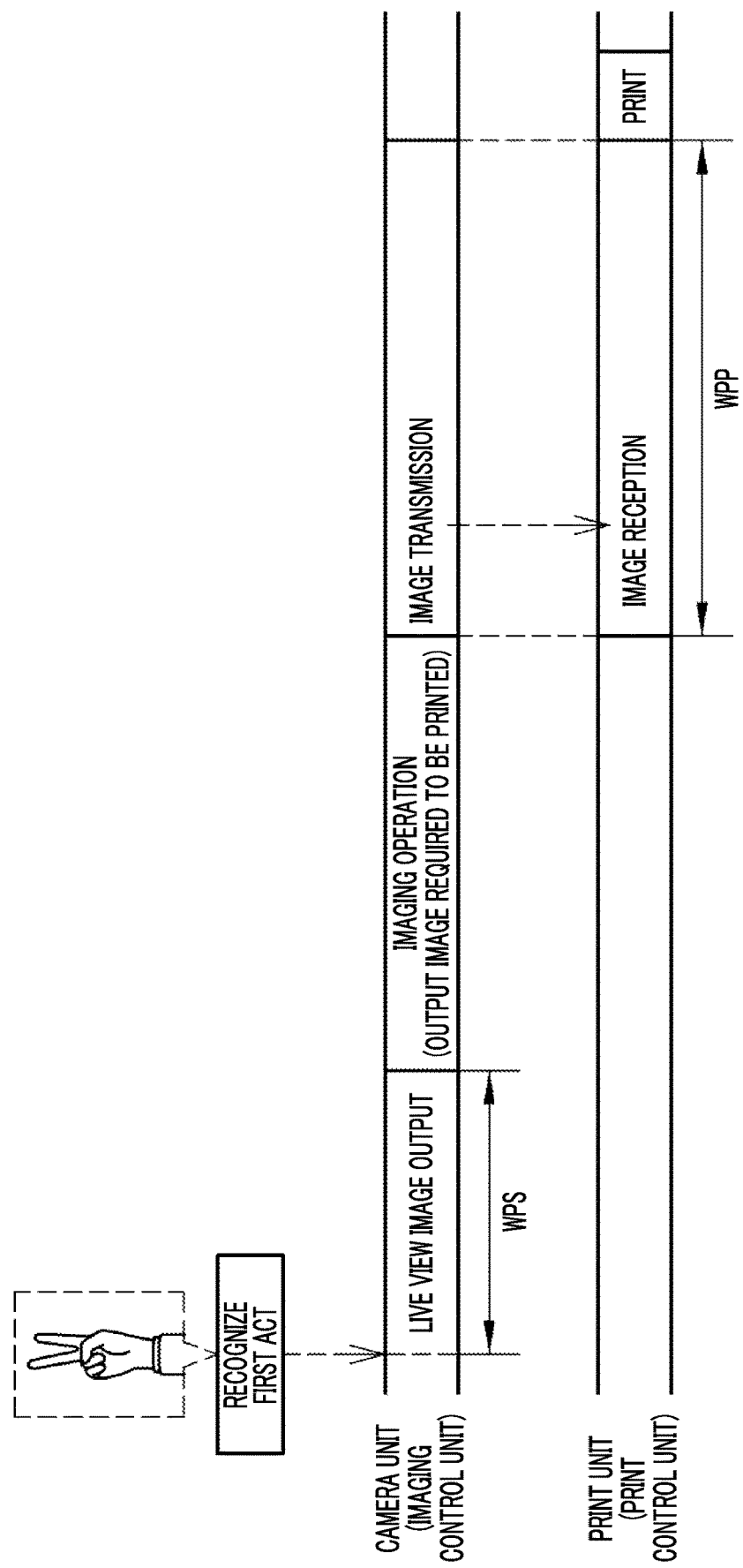
FIG. 14 is a diagram showing a transition of operations of the camera unit and a printer unit in a case where the first act is recognized and the second act is not recognized.

As shown in FIG. 14, the imaging control unit 66 performs processing of transferring the image 14P required to be printed from the image memory 46 of the camera unit 21 to the print head 51 of the printer unit 22 during a predetermined print standby period WPP. Further, in a case where the second act is not recognized during the print standby period WPP, the print control unit 67 causes the printer unit 22 to print the image 14P. The print standby period WPP is a period that starts in a case where the camera unit 21 outputs the image 14P and is, for example, 10 seconds.

Figure 15:
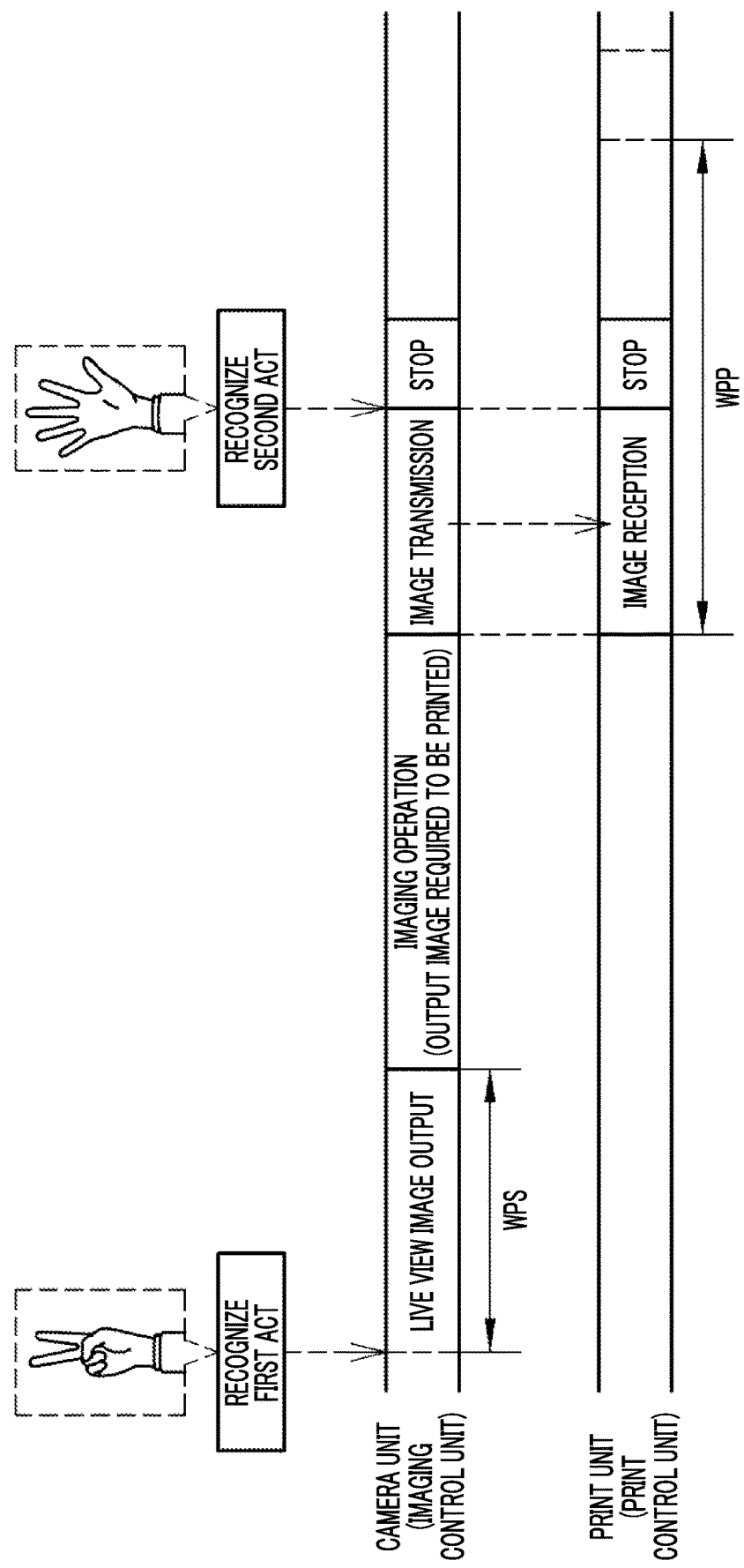
FIG. 15 is a diagram showing a transition of the operations of the camera unit and the printer unit in a case where the first act is recognized and the second act is recognized.

On the other hand, as shown in FIG. 15, in a case where the second act is recognized during the print standby period WPP, the imaging control unit 66 stops the transfer of the image 14P. Further, the print control unit 67 instructs the printer unit 22 to stop printing the image 14P.

Figure 16:
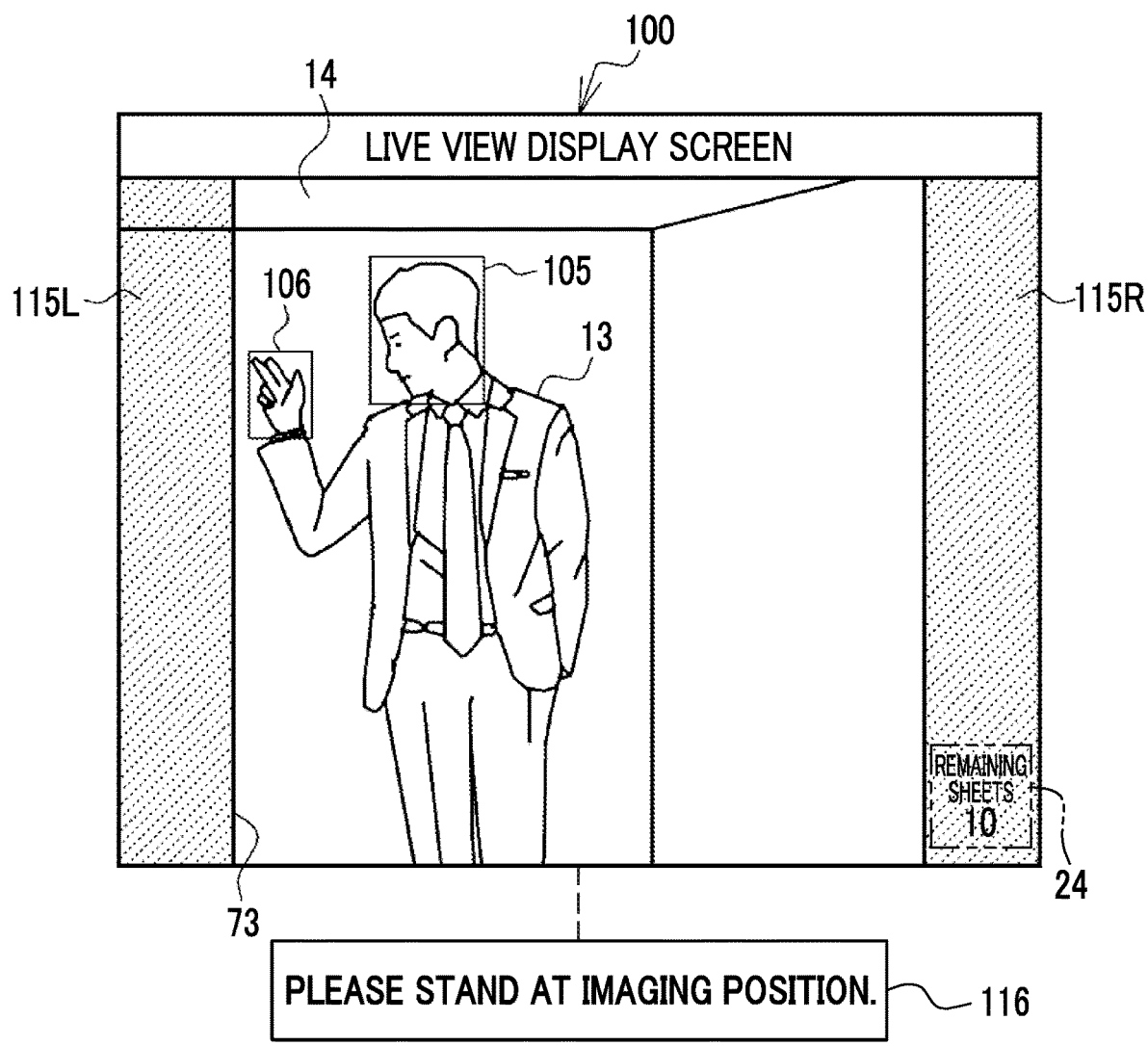
FIG. 16 is a diagram showing a live view display screen and a guide voice in a case where a participant is not standing at an imaging position and a face detection region does not have a predetermined set size.

As shown in FIG. 16, the image 14 is displayed in a live view on the live view display screen 100 output to the display 17 under control of the display control unit 94. Regions 115L and 115R at both left and right ends of the image 14 other than the print region 73 are grayed out as shown by hatching. That is, the display control unit 94 performs the control of displaying the print region 73 on the image 14.

The display control unit 94 performs the control of displaying the remaining number of sheets 24 of the instant film 15 at a lower part of the region 115R. Further, the display control unit 94 performs the control of displaying the face detection region 105 and the hand detection region 106 on the image 14.

FIG. 16 shows the live view display screen 100 in a case where the participant 13 is not standing at the imaging position and the face detection region 105 does not have the predetermined set size. In this case, as shown by a reference numeral 116, the voice control unit 68 outputs "Please stand at imaging position", which is a guide voice for guiding the participant 13 to the imaging position, from the speaker 23.

Figure 17:
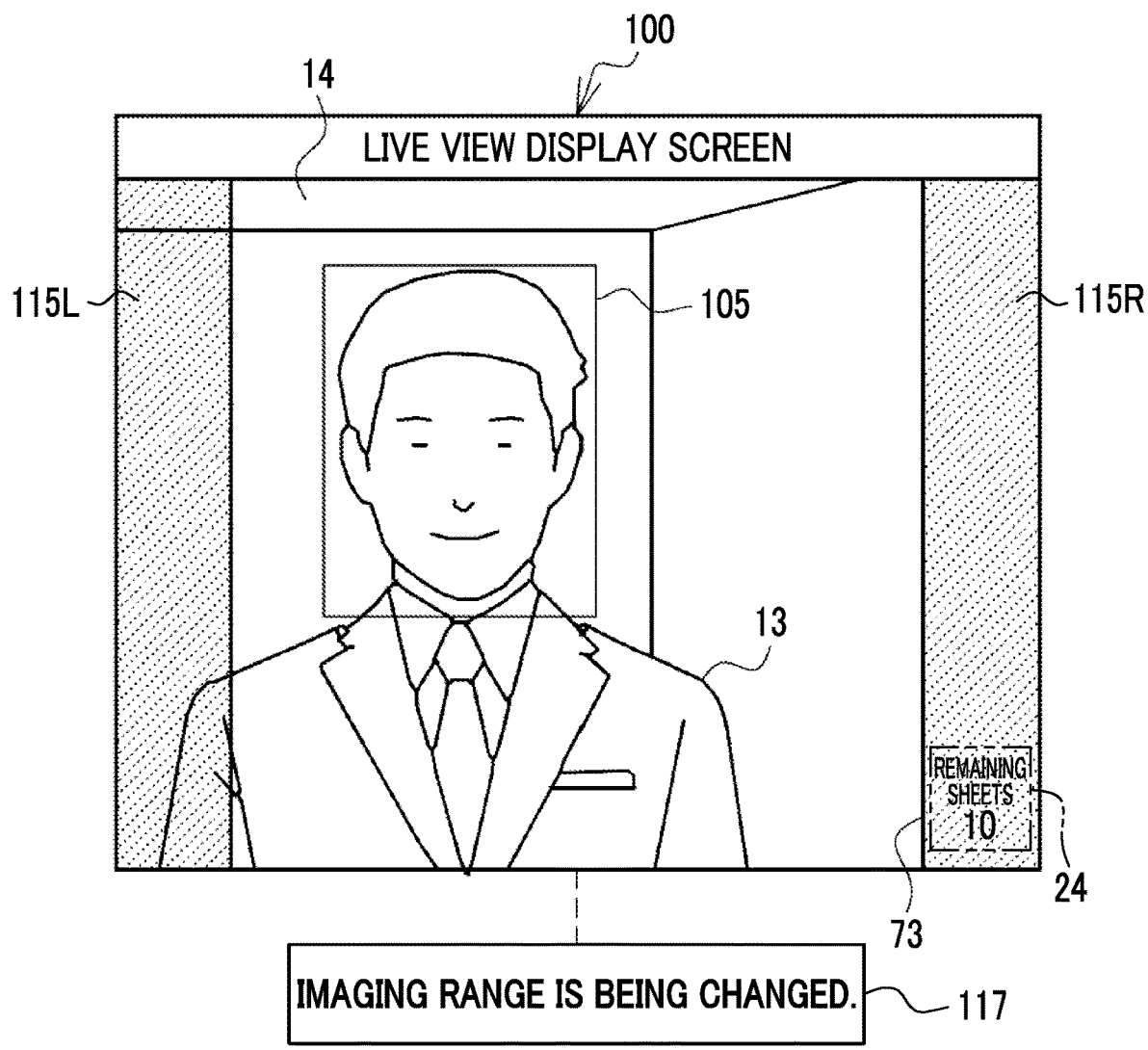
FIG. 17 is a diagram showing the live view display screen and the guide voice in a case where control of changing the imaging range of the camera unit is performed.

FIG. 17 shows the live view display screen 100 in a case where the participant 13 stands at the imaging position and the face detection region 105 has the predetermined set size. Further, FIG. 17 shows the live view display screen 100 in a case where the center CP of the face detection region 105 deviates from the center line CL of the long side of the image 14 and the movement control unit 65 performs control of changing the imaging range 110 of the camera unit 21 such that the face position of the participant 13 is set to the center position of the image 14. In this case, as shown by a reference numeral 117, the voice control unit 68 outputs "Imaging range is being changed", which is a guide voice indicating that the imaging range 110 of the camera unit 21 is changed, from the speaker 23.

Figure 18:
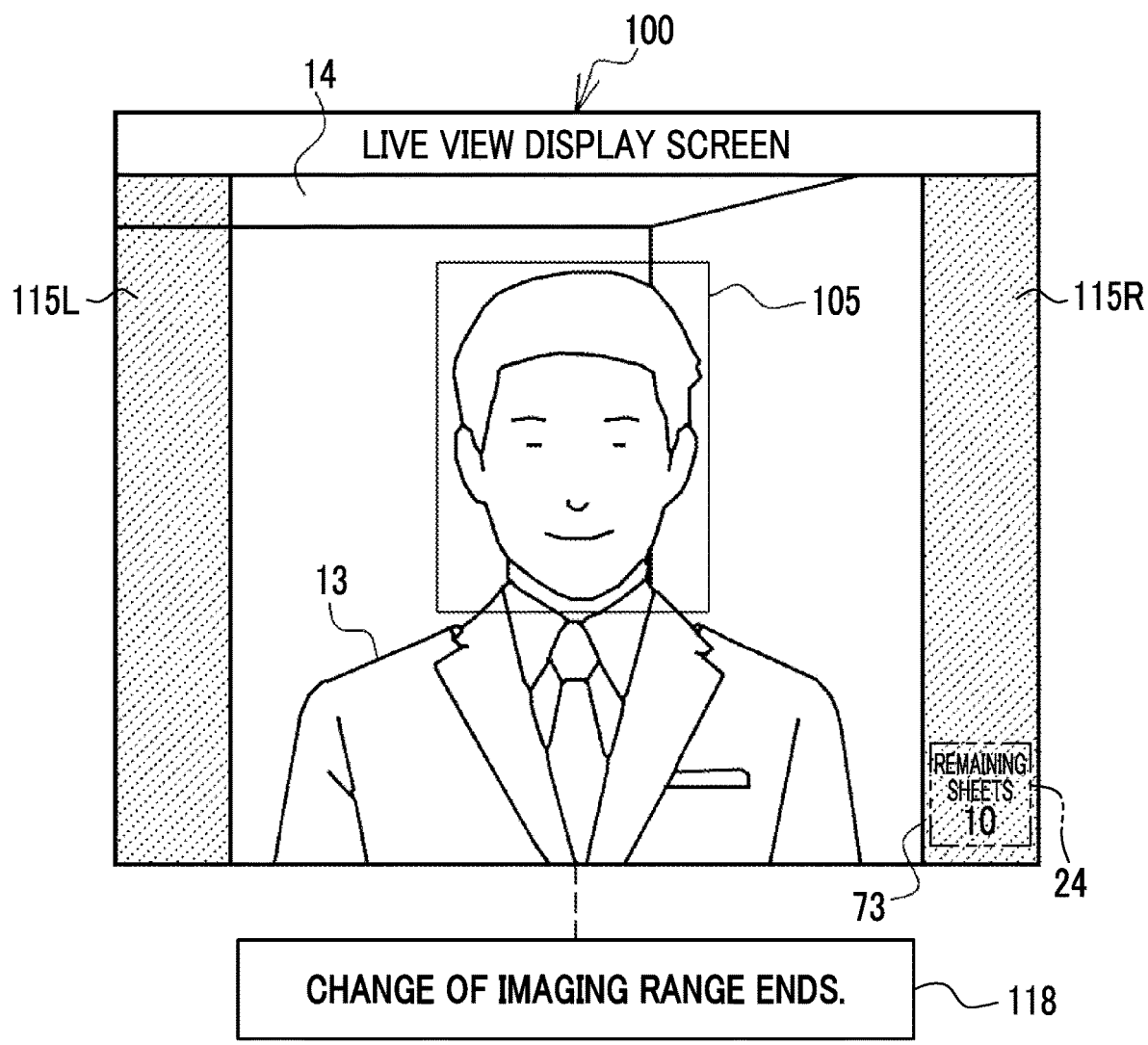
FIG. 18 is a diagram showing the live view display screen and the guide voice in a case where the change in the imaging range of the camera unit ends.

FIG. 18 shows the live view display screen 100 in a case where the movement control unit 65 ends the change of the imaging range 110 of the camera unit 21 and the face position of the participant 13 becomes the center position of the image 14. In this case, as shown by a reference numeral 118, the voice control unit 68 outputs "Change of imaging range ends", which is a guide voice indicating that the change of the imaging range 110 of the camera unit 21 ends, from the speaker 23.

Figure 19:
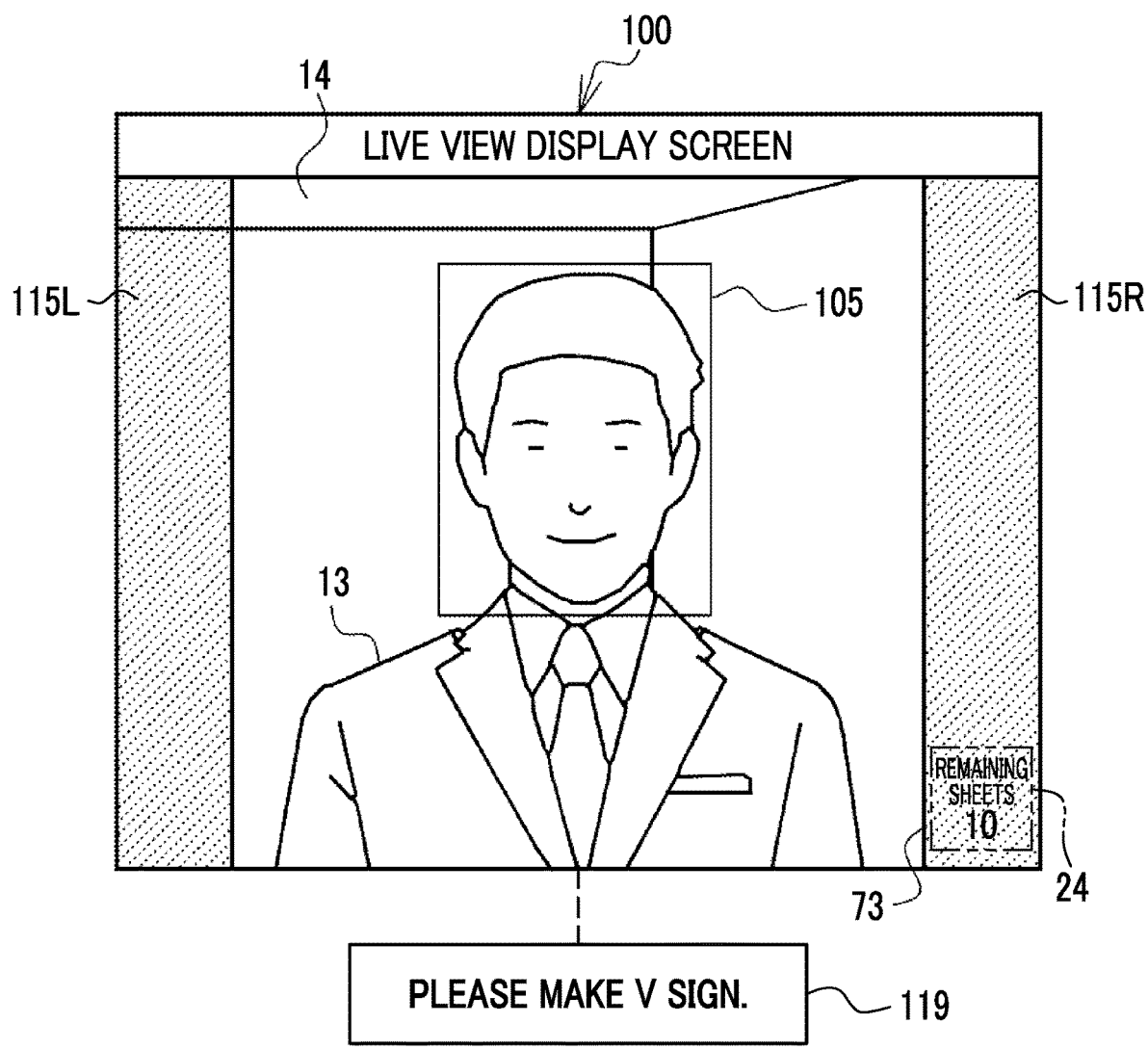
FIG. 19 is a diagram showing the live view display screen and the guide voice in a case where the position of the participant face is the center position of the image.

FIG. 19 shows the live view display screen 100 in a case where the face position of the participant 13 is the center position of the image 14. In this case, as shown by a reference numeral 119, the voice control unit 68 outputs "Please make V sign.", which is a guide voice for prompting the participant 13 to make the V sign which is the first act, from the speaker 23.

Figure 20:
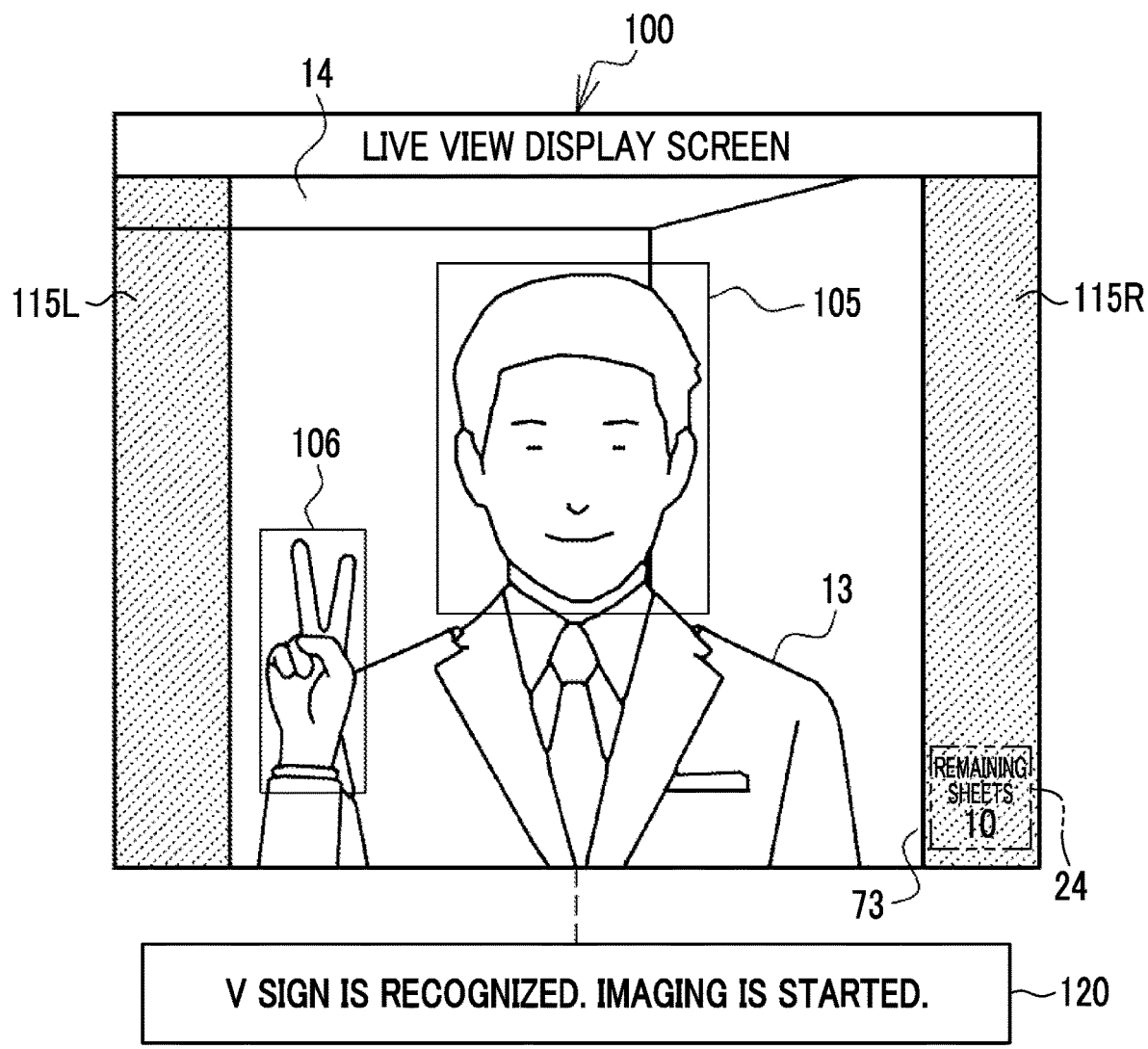
FIG. 20 is a diagram showing the live view display screen and the guide voice in a case where the participant performs a V sign and the gesture recognition unit recognizes the first act.

FIG. 20 shows the live view display screen 100 in a case where the participant 13 makes the V sign and the gesture recognition unit 89 recognizes the first act. In this case, as shown by a reference numeral 120, the voice control unit 68 outputs "V sign is recognized. Imaging is started.", which is a guide voice indicating that the V sign has been recognized and the operation to capture the image 14P is performed, from the speaker 23. That is, the voice control unit 68 notifies the participant 13 that the first act has been recognized.

Figure 21:
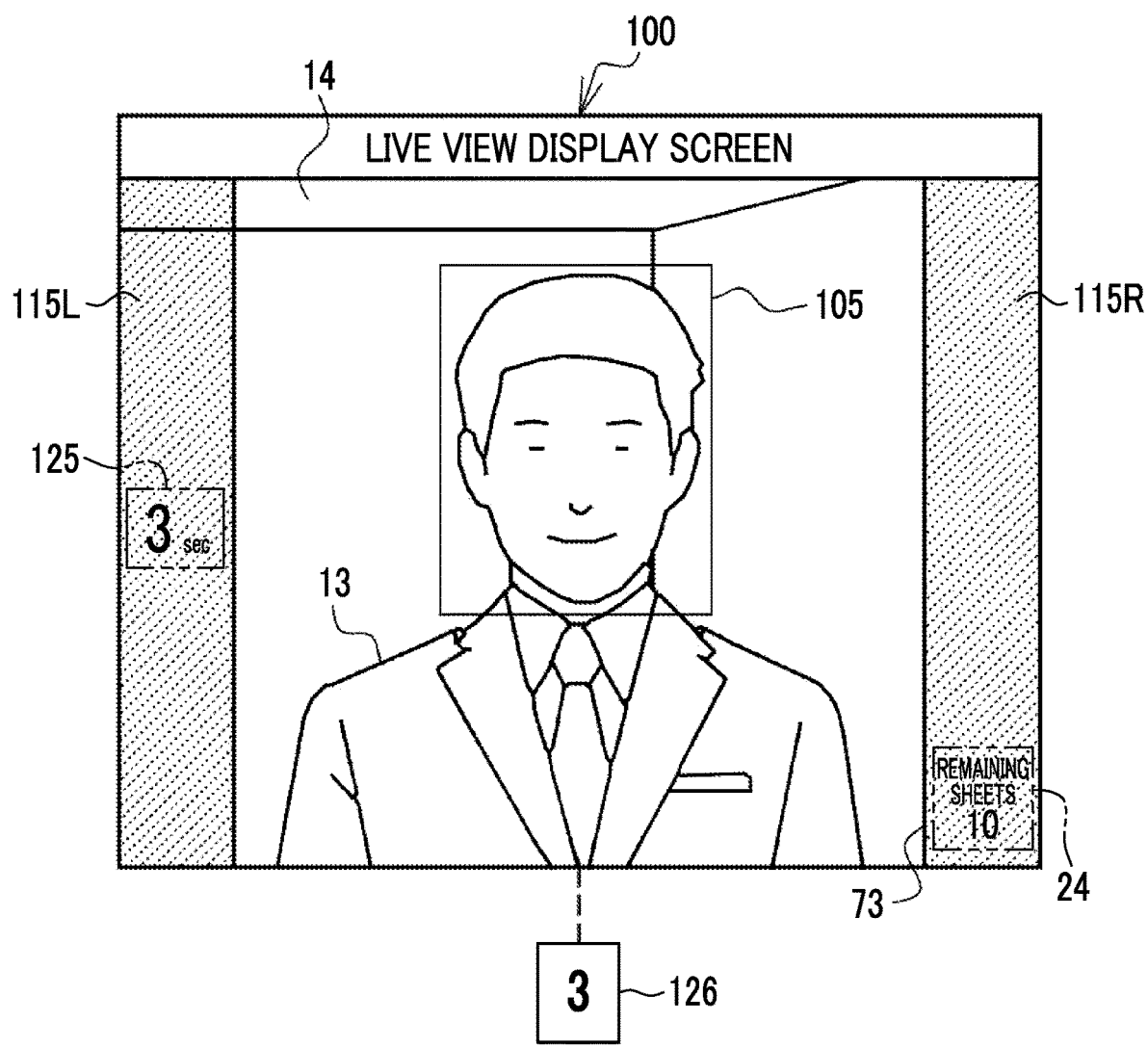
FIG. 21 is a diagram showing the live view display screen and the guide voice in a case where the remaining number of seconds in an imaging standby period is 3 seconds.
Figure 22:
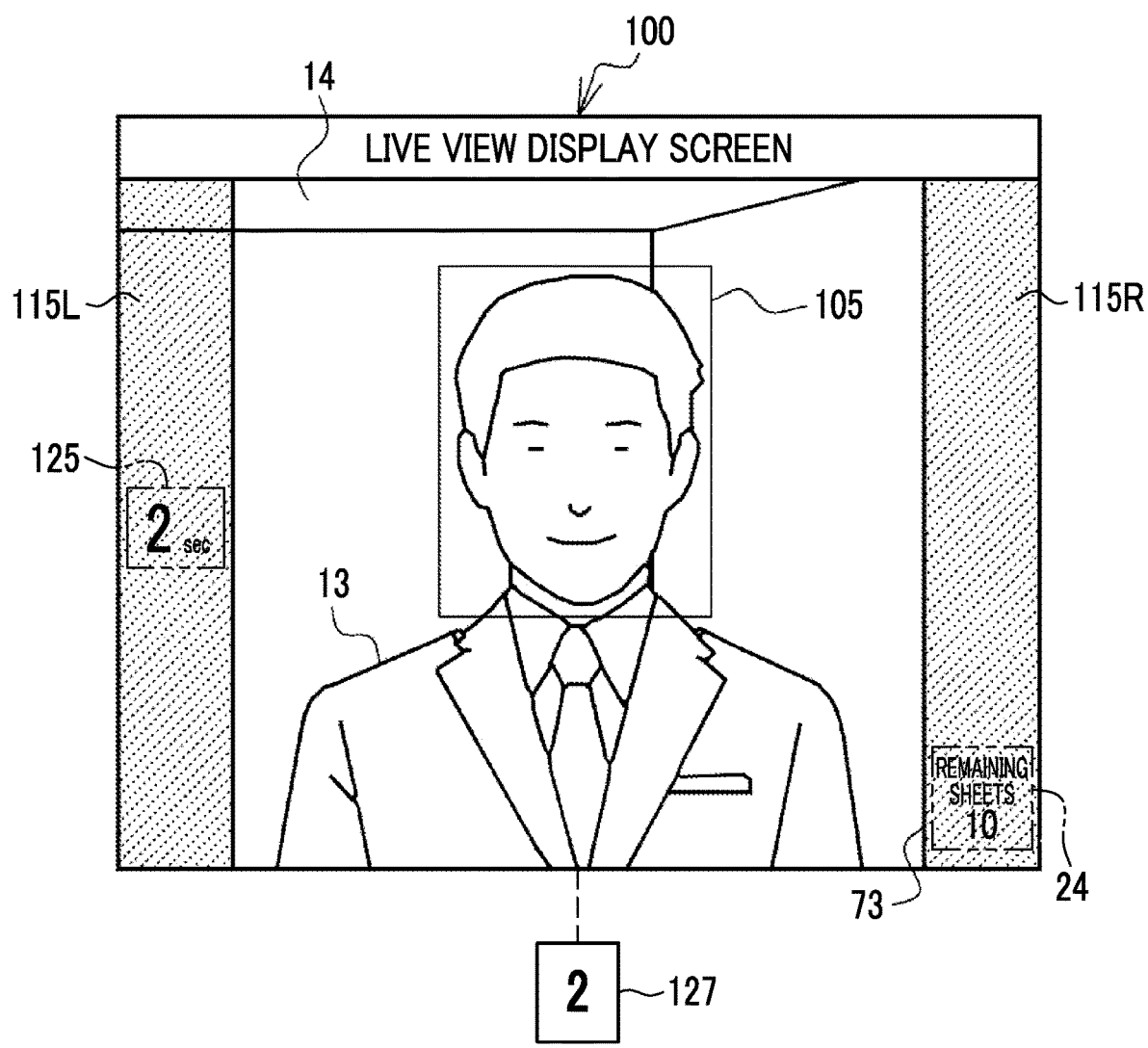
FIG. 22 is a diagram showing the live view display screen and the guide voice in a case where the number of seconds remaining in the imaging standby period is 2 seconds.
Figure 23:
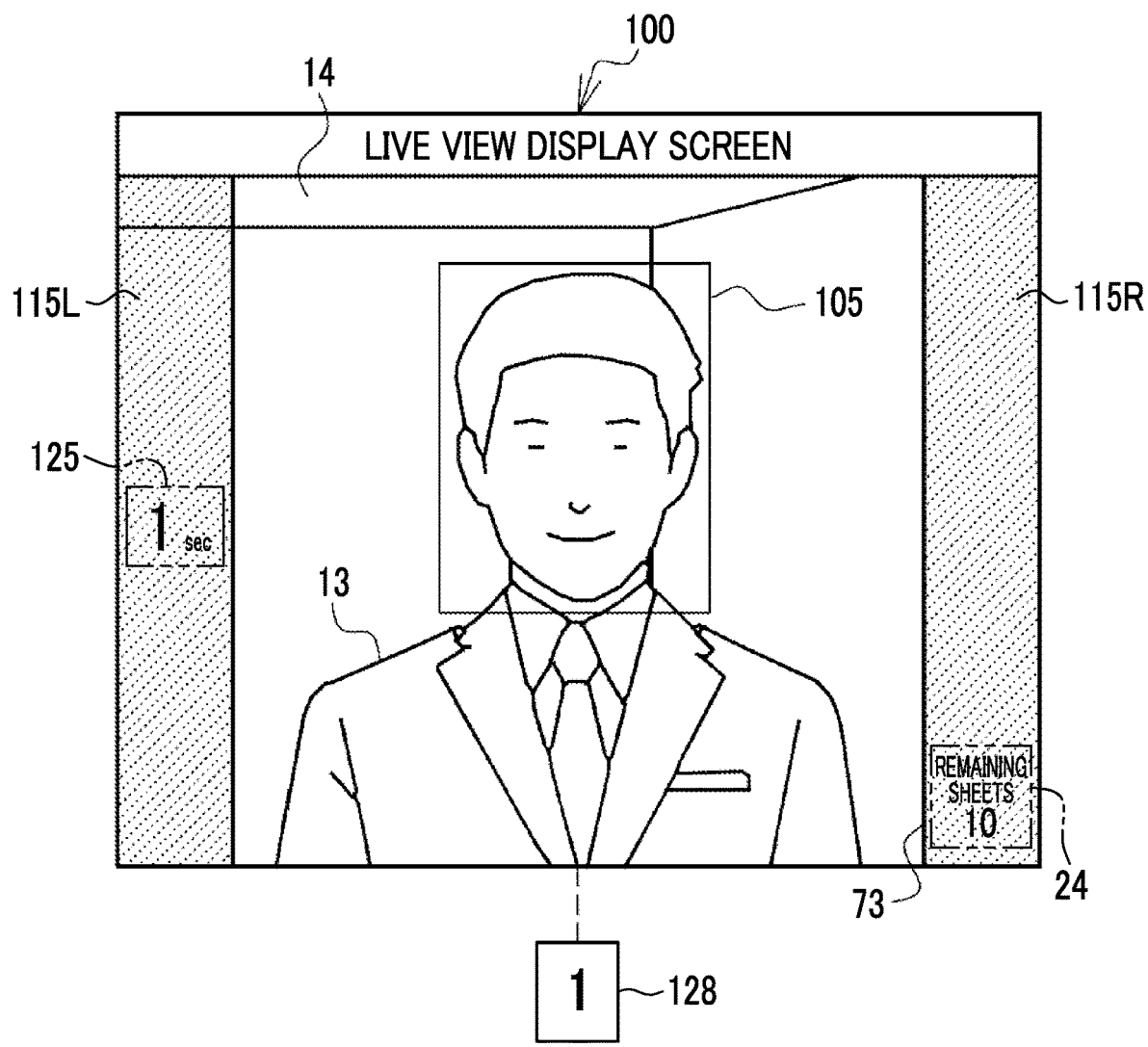
FIG. 23 is a diagram showing the live view display screen and the guide voice in a case where the number of seconds remaining in the imaging standby period is 1 second.

FIGS. 21 to 23 show the live view display screens 100 in the imaging standby period WPS. In this case, the display control unit 94 performs control of displaying a remaining number of seconds 125 in the imaging standby period WPS in a central part of the region 115L. That is, the display control unit 94 notifies the participant 13 of an elapsed situation of the imaging standby period WPS.

FIG. 21 shows the live view display screen 100 in a case where the imaging standby period WPS has started and the remaining number of seconds 125 is 3 seconds. In this case, as shown by a reference numeral 126, the voice control unit 68 outputs "3", which is a guide voice indicating that the remaining number of seconds 125 is 3 seconds, from the speaker 23.

FIG. 22 shows the live view display screen 100 in a case where the remaining number of seconds 125 is 2 seconds. In this case, as shown by a reference numeral 127, the voice control unit 68 outputs "2", which is a guide voice indicating that the remaining number of seconds 125 is 2 seconds, from the speaker 23.

FIG. 23 shows the live view display screen 100 in a case where the remaining number of seconds 125 is 1 second. In this case, as shown by a reference numeral 128, the voice control unit 68 outputs "1", which is a guide voice indicating that the remaining number of seconds 125 is 1 second, from the speaker 23. That is, the voice control unit 68 also notifies the participant 13 of the elapsed situation of the imaging standby period WPS.

Figure 24:
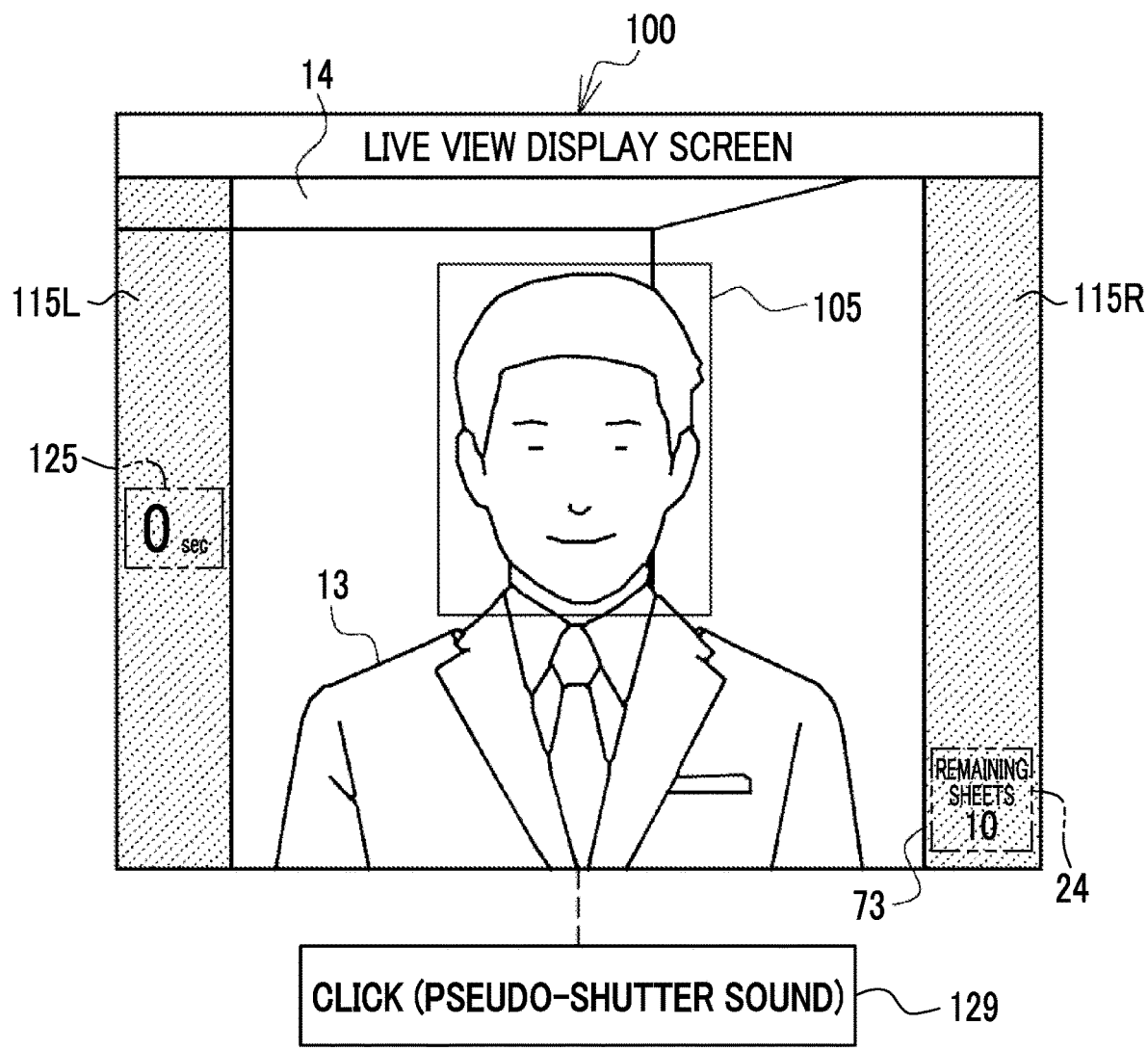
FIG. 24 is a diagram showing a live view display screen and a pseudo shutter sound in a case where an operation to capture the image is performed.

FIG. 24 shows the live view display screen 100 in a case where the imaging standby period WPS ends with the remaining number of seconds 125 of 0 seconds and the operation to capture the image 14P is performed. In this case, as shown by a reference numeral 129, the voice control unit 68 outputs "click", which is a pseudo-shutter sound indicating that the shutter 42 has been released, from the speaker 23. That is, the voice control unit 68 notifies the participant 13 of an execution timing of the operation to capture the image 14P. The execution timing of the operation to capture the image 14P may be paraphrased as an imaging timing of the image 14P. In this case, the live view display screen 100 momentarily displays a black image obtained in a case where the shutter 42 is released. The black image also allows the participant 13 to be notified of the execution timing of the operation to capture the image 14P.

Figure 25:
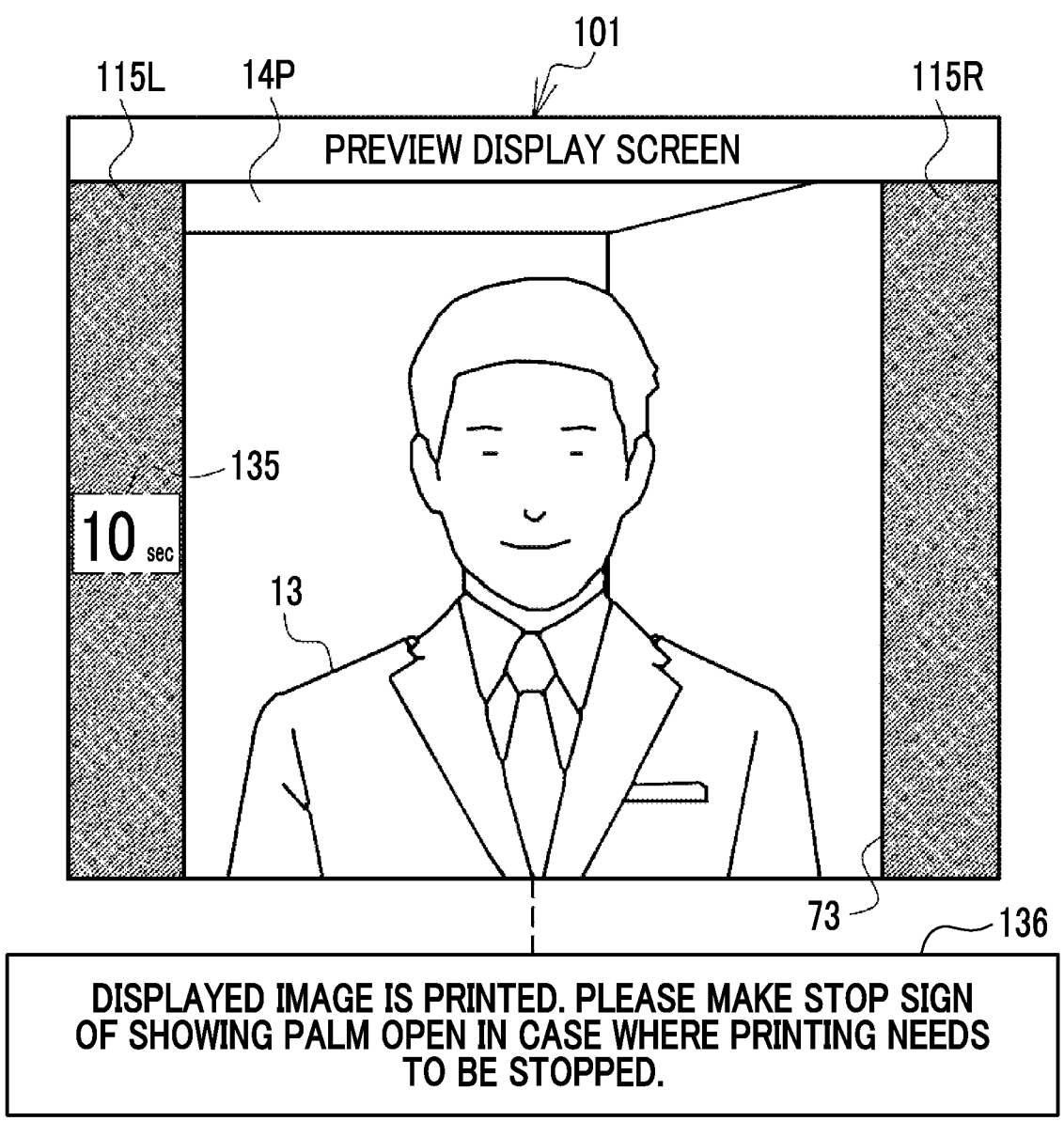
FIG. 25 is a diagram showing a preview display screen and a guide voice in a case where the number of seconds remaining in a print standby period is 10 seconds.

As shown in FIG. 25, the image 14P before the printing is displayed as a preview on the preview display screen 101 output to the display 17 during the print standby period WPP under the control of the display control unit 94. The regions 115L, 115R are blacked out as shown by hatching. That is, the display control unit 94 performs the control of displaying the print region 73 also on the preview display screen 101 as in the case of the live view display screen 100.

The display control unit 94 performs the control of displaying a remaining number of seconds 135 in the print standby period WPP in the central part of the region 115L. That is, the display control unit 94 notifies the participant 13 of the elapsed situation of the print standby period WPP.

FIG. 25 shows the preview display screen 101 in a case where the print standby period WPP has started and the remaining number of seconds 135 is 10 seconds. In this case, as shown by a reference numeral 136, the voice control unit 68 outputs "Displayed image is printed. Please make stop sign of showing palm open in case where printing needs to be stopped.", which is a guide voice indicating that the displayed image 14P is printed and the stop sign, which is the second act, is desired to be made in a case where the printing needs to be stopped, from the speaker 23.

Figure 26:
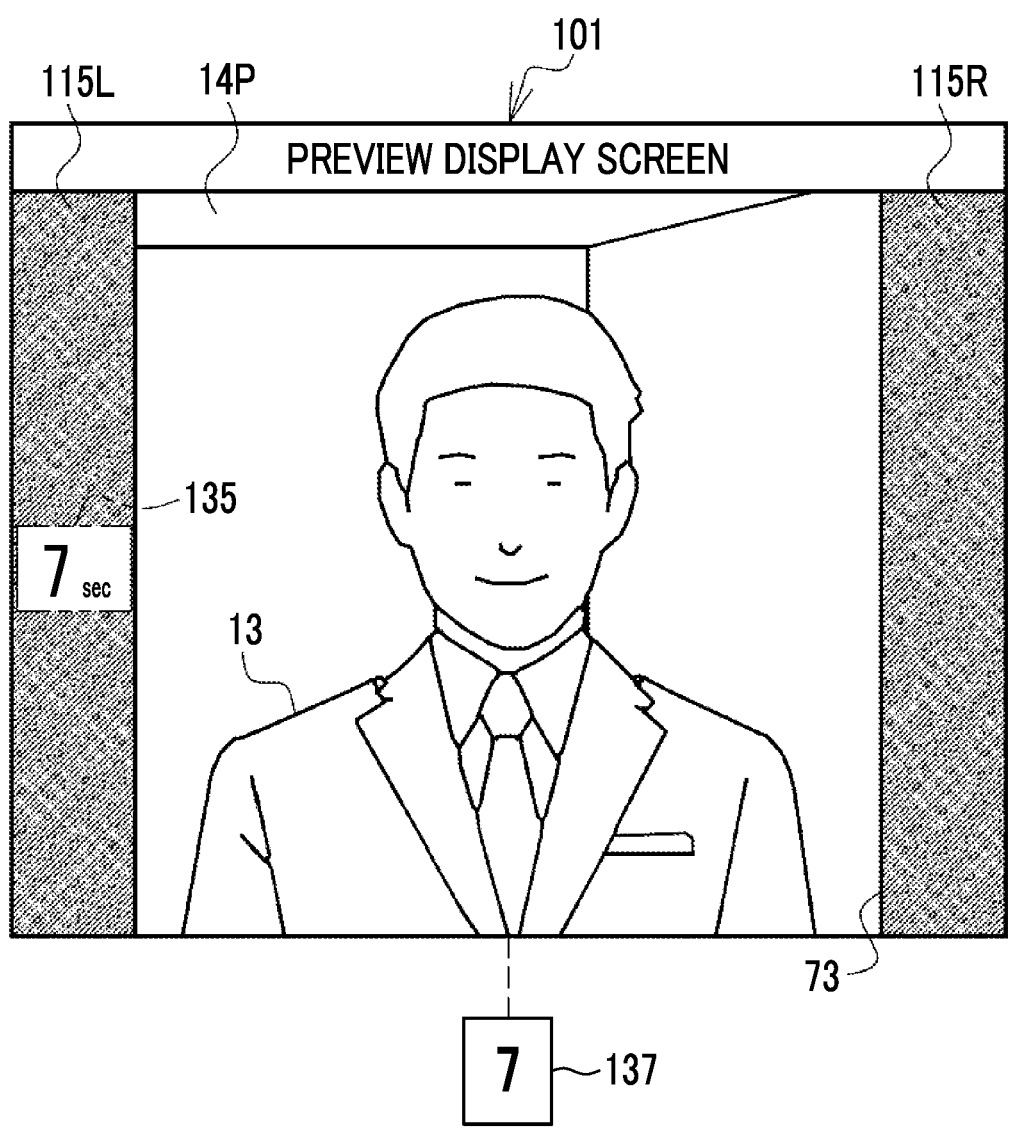
FIG. 26 is a diagram showing the preview display screen and the guide voice in a case where the number of seconds remaining in the print standby period is 7 seconds.

FIG. 26 shows the preview display screen 101 in a case where the remaining number of seconds 135 is 7 seconds. In this case, as shown by a reference numeral 137, the voice control unit 68 outputs "7", which is a guide voice indicating that the remaining number of seconds 135 is 7 seconds, from the speaker 23. Although not shown, even in a case where the remaining number of seconds 135 is 6 seconds or less, the guide voice indicating the remaining number of seconds 135 is output from the speaker 23 under the control of the voice control unit 68.

Figure 27:
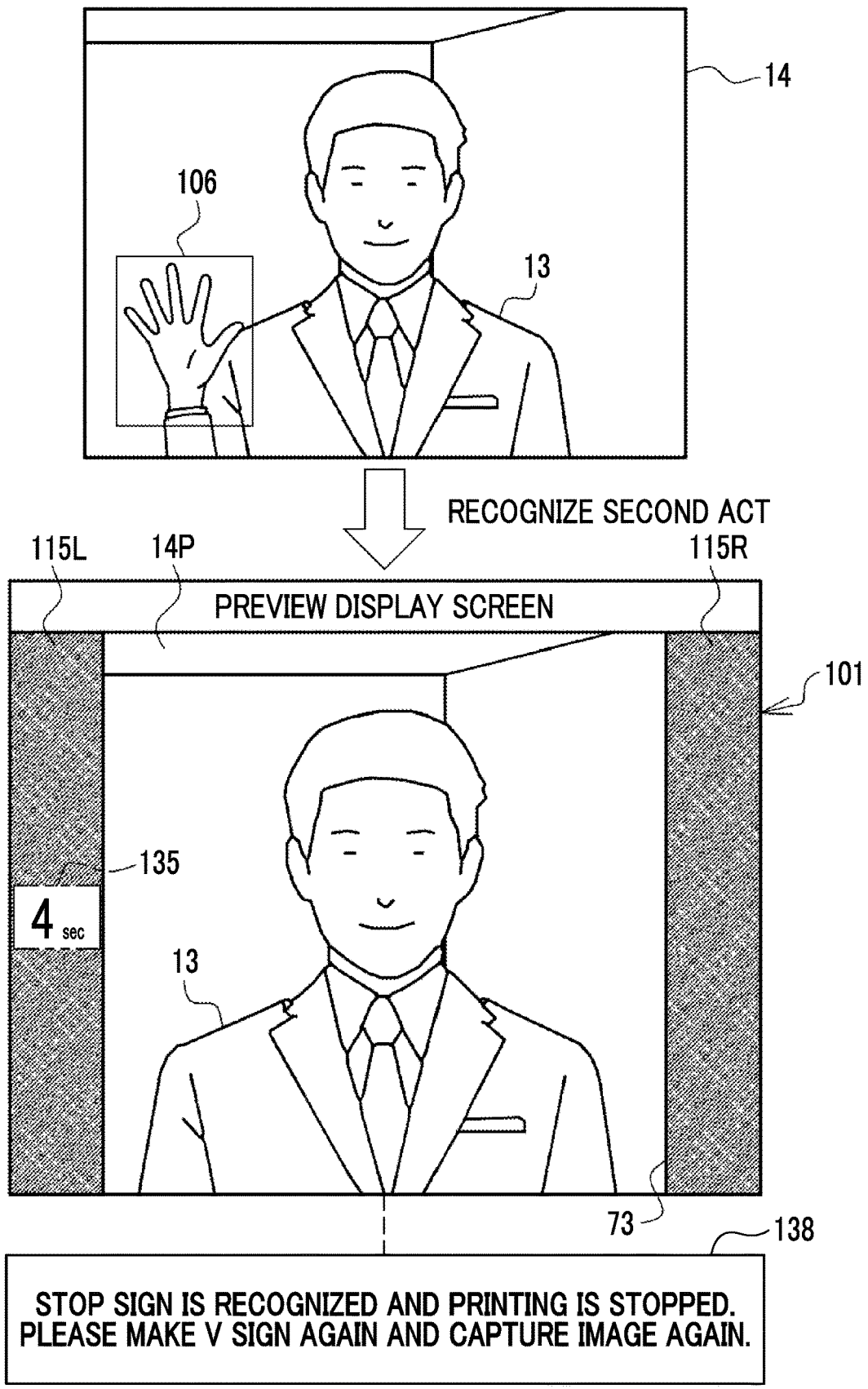
FIG. 27 is a diagram showing the preview display screen and the guide voice in a case where the participant performs a stop sign and the gesture recognition unit recognizes the second act.

FIG. 27 shows the preview display screen 101 in a case where the participant 13 makes the stop sign and the gesture recognition unit 89 recognizes the second act. In this case, as shown by a reference numeral 138, the voice control unit 68 outputs "Stop sign is recognized and printing needs to be stopped. Please make V sign again and capture image again.", which is a guide voice indicating that the printing of the image 14P is stopped due to the recognition of the stop sign and indicating that re-capturing of the image 14P is prompted, from the speaker 23. That is, the voice control unit 68 notifies the participant 13 that the second act has been recognized.

Next, an action of the above configuration will be described with reference to flowcharts of FIGS. 28 to 30. First, in a case where the operation program 60 is activated, the controller 56 of the digital camera with the printer 10 functions as the movement control unit 65, the imaging control unit 66, the print control unit 67, and the voice control unit 68, as shown in FIG. 5. Further, in a case where the operation program 80 is activated, the CPU 77 of the control device 11 functions as the image reception unit 85, the remaining number of sheets reception unit 86, the face detection unit 87, the hand detection unit 88, the gesture recognition unit 89, the movement control signal generation unit 90, the imaging control signal generation unit 91, the print control signal generation unit 92, the control signal transmission unit 93, and the display control unit 94, as shown in FIG. 8.

In the digital camera with the printer 10, the image 14 is output from the camera unit 21. The image 14 is transmitted to the control device 11 by the transmission unit 52.

In the control device 11, the image reception unit 85 receives the image 14 from the digital camera with the printer 10. The image 14 is output from the image reception unit 85 to the face detection unit 87, the hand detection unit 88, and the display control unit 94.

Figure 28:
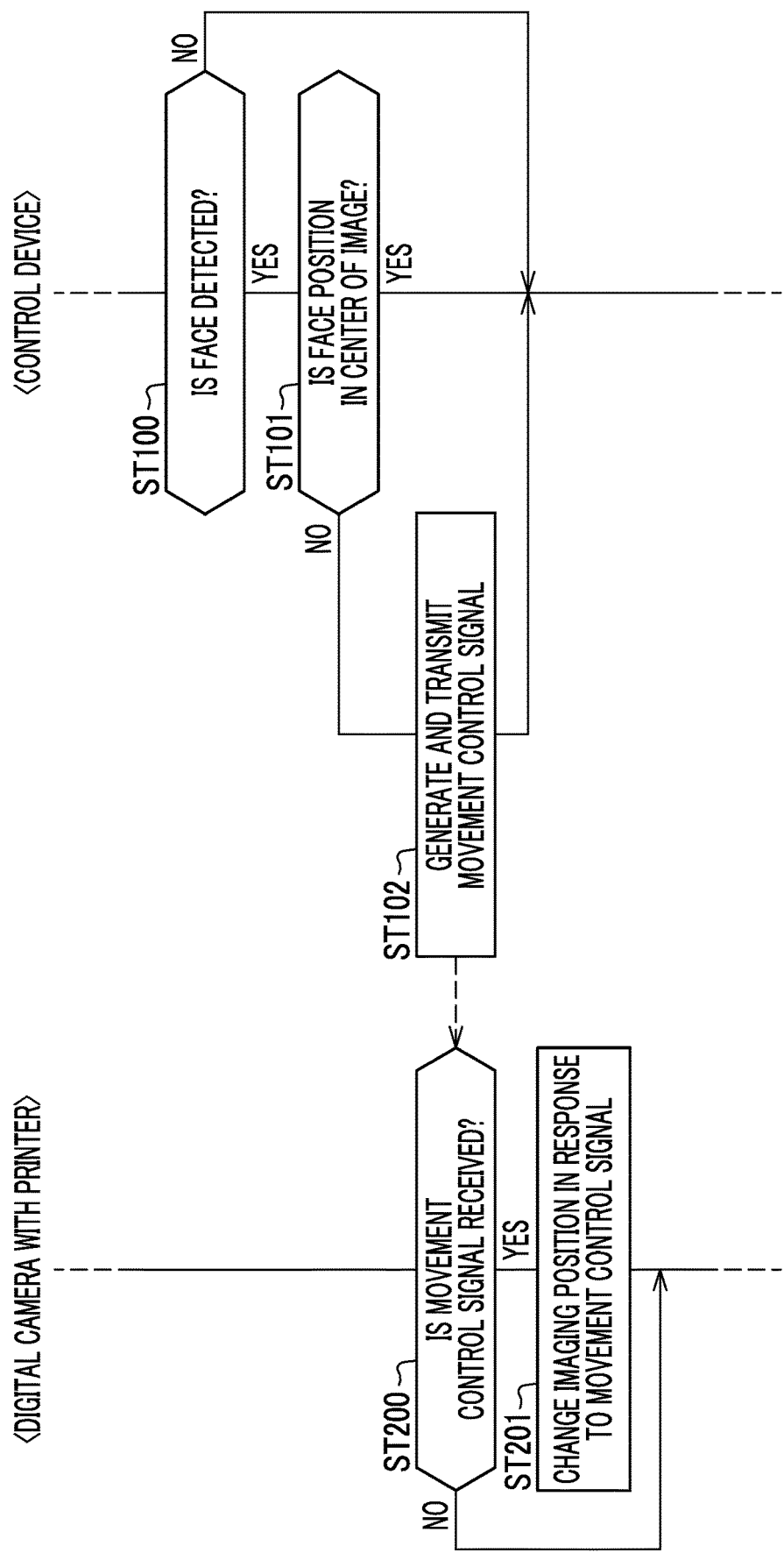
FIG. 28 is a flowchart showing a processing procedure of the digital camera with the printer and the control device.

In FIG. 28, in a case where the face detection unit 87 detects the face of the participant 13 from the image 14 (YES in step ST100) and the face position is not in the center position of the image 14 due to the deviation between the center CP of the face detection region 105 and the center line CL of the image 14 (NO in step ST101), the movement control signal generation unit 90 generates the movement control signal 25 for setting the face position to the center position of the image 14 by matching the center CP and the center line CL. The movement control signal 25 is output from the movement control signal generation unit 90 to the control signal transmission unit 93 and is transmitted to the digital camera with the printer 10 by the control signal transmission unit 93 (step ST102).

In the digital camera with the printer 10, the reception unit 53 receives the movement control signal 25 (YES in step ST200). The movement control signal 25 is output from the reception unit 53 to the movement control unit 65.

As shown in FIG. 10, the movement control unit 65 operates the movement mechanism 20 in response to the movement control signal 25 to change the imaging range 110 of the camera unit 21. With the change, the control of setting the face position of the participant 13 to the center position of the image 14 is performed (step ST201).

Figure 29:
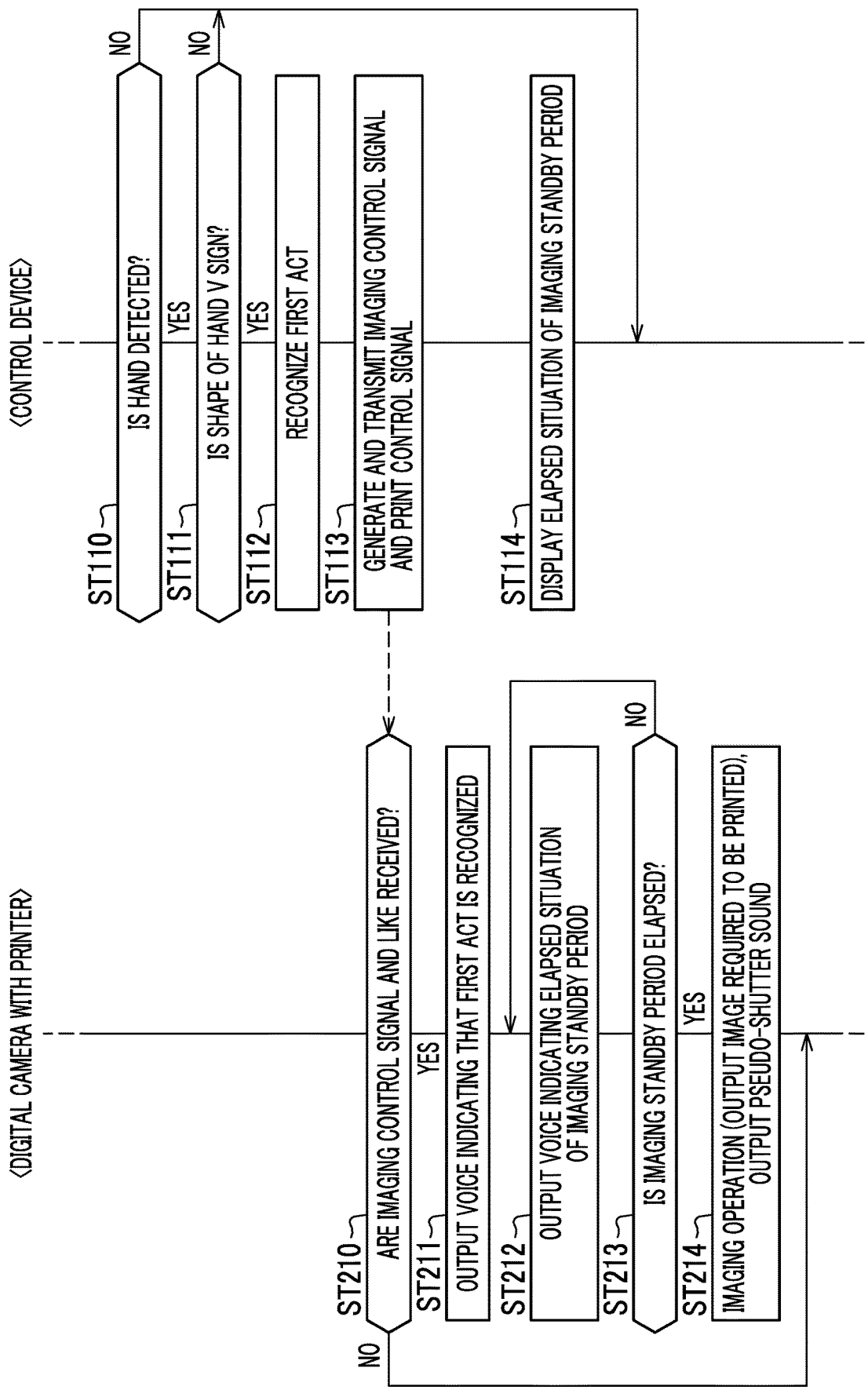
FIG. 29 is a flowchart showing the processing procedure of the digital camera with the printer and the control device.

In FIG. 29, in a case where the hand of the participant 13 is detected from the image 14 by the hand detection unit 88 (YES in step ST110) and a shape of the detected hand is the V sign shown in FIG. 11 (YES in step ST111), the first act is recognized by the gesture recognition unit 89 (step ST112). The recognition result that the first act has been recognized is output from the gesture recognition unit 89 to the imaging control signal generation unit 91 and the print control signal generation unit 92. Step ST112 is an example of "first recognition step" according to the technique of the present disclosure.

The imaging control signal generation unit 91 generates the imaging control signal 26 representing the instruction to image the image 14P. The imaging control signal 26 is output from the imaging control signal generation unit 91 to the control signal transmission unit 93. Further, the print control signal generation unit 92 generates the print control signal 27 representing the instruction to print the image 14P. The print control signal 27 is output from the print control signal generation unit 92 to the control signal transmission unit 93. The imaging control signal 26 and the print control signal 27 are transmitted to the digital camera with the printer 10 by the control signal transmission unit 93 (step ST113).

In the digital camera with the printer 10, the imaging control signal 26 and the print control signal 27 are received by the reception unit 53 (YES in step ST210). The imaging control signal 26 is output from the reception unit 53 to the imaging control unit 66. The print control signal 27 is output from the reception unit 53 to the print control unit 67.

As shown in FIG. 20, a guide voice 120 indicating that the first act has been recognized is output from the speaker 23 under the control of the voice control unit 68 (step ST211). As shown in FIGS. 21 to 23, the display control unit 94 displays the remaining number of seconds 125 in the imaging standby period WPS on the live view display screen 100 (step ST114). Further, under the control of the voice control unit 68, guide voices 126 to 128 indicating the remaining number of seconds 125 are output from the speaker 23 (step ST212). Accordingly, the participant 13 is notified of the elapsed situation of the imaging standby period WPS.

As shown in FIG. 13, after the imaging standby period WPS has elapsed (YES in step ST213), the camera unit 21 performs the operation to capture the image 14P under the control of the imaging control unit 66. In this case, as shown in FIG. 24, a pseudo shutter sound 129 is output from the speaker 23 under the control of the voice control unit 68 (step ST214). Step ST214 is an example of "imaging control step" according to the technique of the present disclosure.

Figure 30:
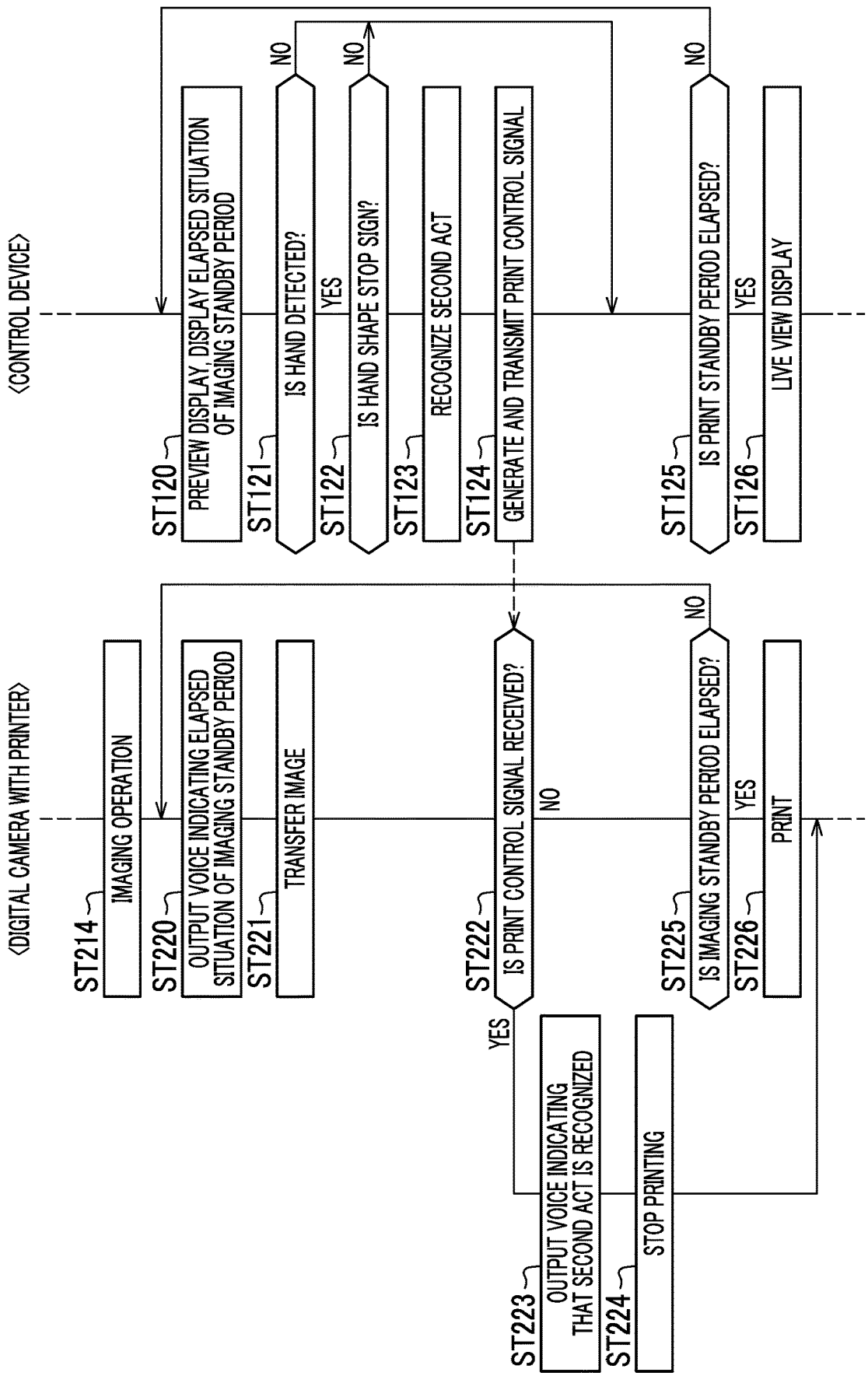
FIG. 30 is a flowchart showing the processing procedure of the digital camera with the printer and the control device.

In FIG. 30, after the imaging operation, as shown in FIGS. 25 and 26, the display control unit 94 displays the remaining number of seconds 135 in the print standby period WPP on the preview display screen 101 (step ST120). Further, under the control of the voice control unit 68, the guide voice 136 indicating that the displayed image 14P is printed and the stop sign is desired to be made in a case where the printing needs to be stopped is output from the speaker 23, and then the guide voice 137 indicating the remaining number of seconds 135 is output from the speaker 23 (step ST220). Accordingly, the participant 13 is notified of the elapsed situation of the print standby period WPP.

As shown in FIGS. 14 and 15, in the print standby period WPP, the process of transferring the image 14P from the image memory 46 of the camera unit 21 to the print head 51 of the printer unit 22 under the control of the imaging control unit 66 is performed (step ST221).

In a case where the hand of the participant 13 is detected from the image 14 by the hand detection unit 88 (YES in step ST121) and the shape of the detected hand is the stop sign shown in FIG. 12 (YES in step ST122), the second act is recognized by the gesture recognition unit 89 (step ST123). The recognition result that the second act has been recognized is output from the gesture recognition unit 89 to the print control signal generation unit 92. Step ST123 is an example of "second recognition step" according to the technique of the present disclosure.

The print control signal generation unit 92 generates the print control signal 27 representing the instruction to stop printing the image 14P. The print control signal 27 is output from the print control signal generation unit 92 to the control signal transmission unit 93. The print control signal 27 is transmitted to the digital camera with the printer 10 by the control signal transmission unit 93 (step ST124).

In the digital camera with the printer 10, the print control signal 27 is received by the reception unit 53 (YES in step ST222). The print control signal 27 is output from the reception unit 53 to the print control unit 67. In this case, as shown in FIG. 27, the guide voice 138 indicating that the second act has been recognized is output from the speaker 23 under the control of the voice control unit 68 (step ST223). As shown in FIG. 15, the printer unit 22 is not operated by the print control unit 67, and the printing of the image 14P on the instant film 15 is stopped (step ST224). Step ST224 is an example of "print control step" according to the technique of the present disclosure.

In a case where the second act is not recognized during the print standby period WPP and the print control signal 27 representing the print stop instruction is not received by the reception unit 53 (NO in step ST222 and YES in step ST225), the print control unit 67 operates the printer unit 22 to print the image 14P on the instant film 15, as shown in FIG. 14 (step ST226). Accordingly, the instant film 15 on which the image 14P is printed is provided to the participant 13. Step ST226 is an example of "print control step" according to the technique of the present disclosure, like step ST224.

After the print standby period WPP has elapsed (YES in step ST125), the display control unit 94 switches the display from the preview display screen 101 to the live view display screen 100 (step ST126).

As described above, the controller 56 of the digital camera with the printer 10 functions as the imaging control unit 66 and the print control unit 67. The CPU 77 of the control device 11 functions as the gesture recognition unit 89. The gesture recognition unit 89 recognizes the first act that is performed by the participant 13 within the imaging range 110 of the camera unit 21 and is for the imaging and print instruction that combines the instruction to image the image 14P and the instruction to stop the printing of the image 14P. Further, the gesture recognition unit 89 recognizes the second act that is performed by the participant 13 within the imaging range 110 and is for the instruction to stop printing the image 14P. In a case where the first act is recognized, the imaging control unit 66 causes the camera unit 21 to perform the imaging operation of outputting the image 14P. In a case where the second act is not recognized during the print standby period WPP, the print control unit 67 causes the printer unit 22 to print the image 14P. On the other hand, in a case where the second act is recognized during the print standby period WPP, the print control unit 67 instructs the printer unit 22 to stop the printing of the image 14P. Therefore, the instant film 15 may not be wasted.

The participant 13 can input the instruction to stop printing the image 14P to the digital camera with the printer 10 only by performing the second act without moving to an installation position of the digital camera with the printer 10. This reduces a risk that the print stop instruction cannot be made in time. In addition, it is not necessary to prepare the remote controller for the print stop instruction.

The imaging control unit 66 performs processing of transferring the image 14P from the camera unit 21 to the printer unit 22 during the print standby period WPP. With the processing, the print standby period WPP can be recognized by the participant 13 as a period for accepting the print stop instruction without being recognized by the participant 13 as a period that is devoted to the transfer of the image 14P. Therefore, it is not necessary to make the participant 13 feel the stress of having to wait for the transfer of the image 14P.

The display control unit 94 performs control of displaying the image 14P as a preview on the display 17 visible to the participant 13 within the imaging range 110 during the print standby period WPP. Therefore, the participant 13 can surely determine the success or failure of the imaging such as whether or not the appearance of the face is good. In a case where the imaging is determined to fail, the participant 13 can perform the second act for the print stop instruction without hesitation.

The voice control unit 68 and the display control unit 94 notify the participant 13 of the elapsed situation of the print standby period WPP with the remaining number of seconds 135, the guide voice 137, and the like. Therefore, the participant 13 can surely grasp the elapsed situation of the print standby period WPP.

The digital camera with the printer 10 can change the imaging range 110 of the camera unit 21 by the movement mechanism 20. The face detection unit 87 detects the face of the participant 13 from the image 14. The movement control unit 65 performs the control of changing the imaging range 110 to set the face position of the participant 13 to the center position of the image 14. Therefore, regardless of the participant 13, it is possible to capture the image 14P in which the face is located in the center and the composition is substantially the same.

The voice control unit 68 notifies, with the guide voices 120 and 138, the participant 13 that the first act has been recognized and that the second act has been recognized. Therefore, the participant 13 can grasp that the first act and the second act performed by the participant are surely recognized.

The imaging control unit 66 waits until the imaging standby period WPS elapses after the first act is recognized and then causes the camera unit 21 to perform the operation to capture the image 14P. With the above operation, the participant 13 can adjust the facial expression and/or the pose during the imaging standby period WPS. Therefore, it is possible to reduce the imaging failure itself.

The voice control unit 68 and the display control unit 94 notify the participant 13 of the elapsed situation of the imaging standby period WPS with the remaining number of seconds 125 and the guide voices 126 to 128. Therefore, the participant 13 can surely grasp the elapsed situation of the imaging standby period WPS.

The voice control unit 68 notifies the participant 13 of the execution timing of the operation to capture the image 14P with the pseudo shutter sound 129. Therefore, the participant 13 can surely grasp the execution timing of the operation to capture the image 14P.

The first act and the second act are gestures by the participant 13, and the gestures are represented by the hand of the participant 13. Therefore, the participant 13 can issue the imaging and print instruction by the first act and the print stop instruction by the second act only by changing the shape of the hand.

The first act is the gesture (V sign) of pointing the palm side toward the digital camera with the printer 10 in a state where the index finger and the middle finger are raised and the other fingers are bent. The second act is the gesture (stop sign) of pointing the palm side toward the digital camera with the printer 10 in a state where all fingers are spread out. The V sign is a popular pose often taken in a case where a photograph is imaged. The stop sign is a popular pose often taken in a case of, for example, blocking person's approach or refusing a recommended matter. Since these popular poses are employed for the first act and the second act, it is intuitively easy to understand for the participant 13. The participant 13 can perform the first act and the second act without psychological resistance.

The display control unit 94 performs control of graying out the regions 115L and 115R other than the print region 73 to display the print region 73 on the image 14. Therefore, the participant 13 can surely grasp the print region 73.

The display control unit 94 performs control of displaying the remaining number of sheets 24 of the instant film 15. Therefore, an administrator of the imaging system 2 or the like that replaces the film pack 32 can be reliably informed of the remaining number of sheets 24.

Figure 31:
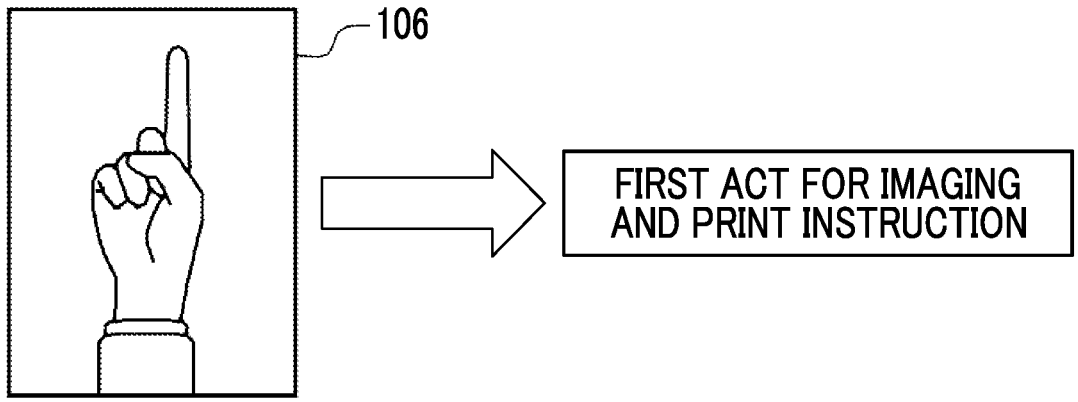
FIG. 31 is a diagram showing another example of the gesture recognized as the first act.
Figure 32:
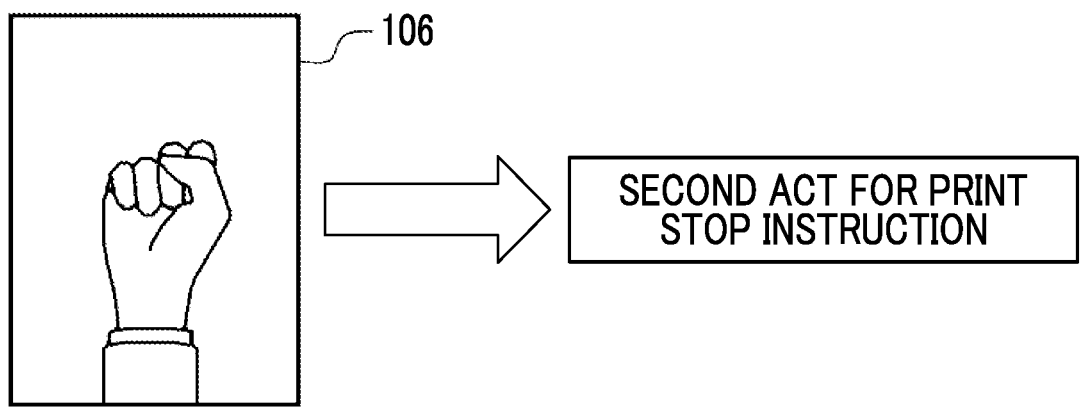
FIG. 32 is a diagram showing another example of the gesture recognized as the second act.

The first act is not limited to the exemplified V sign, and the second act is not limited to the exemplified stop sign. For example, as shown in FIG. 31, the gesture of pointing the palm side toward the digital camera with the printer 10 in a state where the index finger and the middle finger are raised and the other fingers are bent may be recognized as the first act for the imaging and print instruction. Further, as shown in FIG. 32, the gesture of pointing the palm side toward the digital camera with the printer 10 in a state where all fingers are bent may be recognized as the second act for the print stop instruction.

Figure 33:
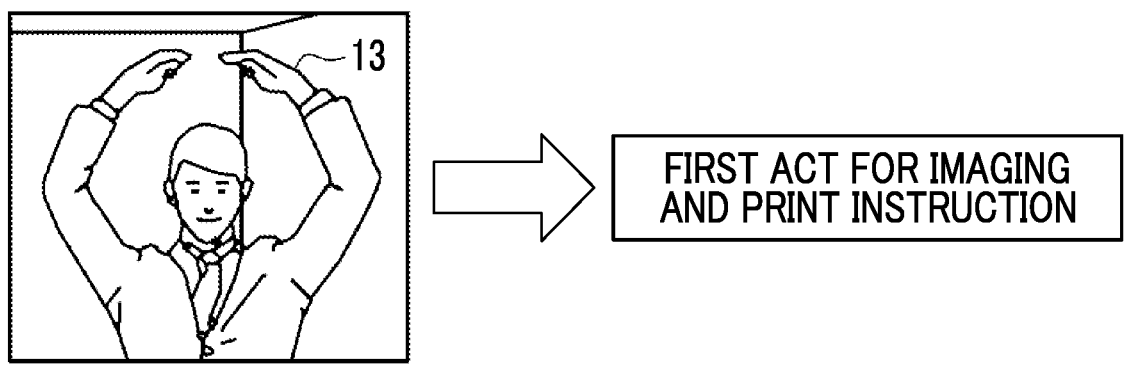
FIG. 33 is a diagram showing another example of the gesture recognized as the first act.
Figure 34:
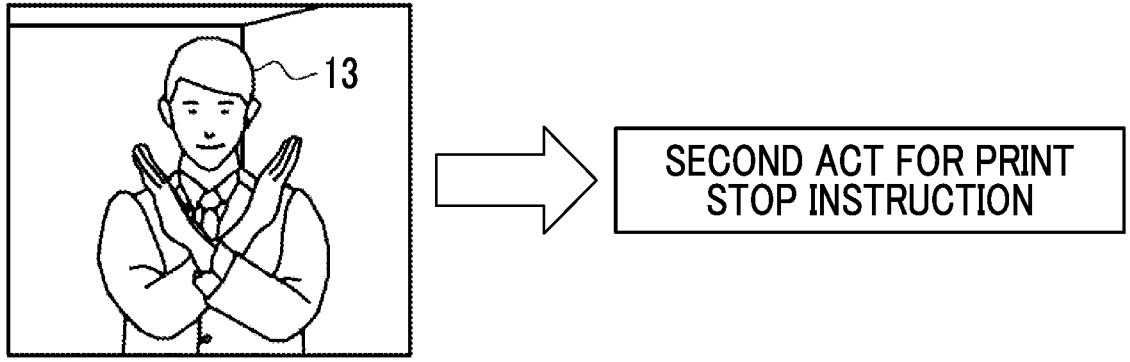
FIG. 34 is a diagram showing another example of the gesture recognized as the second act.

The gestures are not limited to gestures represented by the hand. For example, as shown in FIG. 33, a gesture in which a circle is formed with both arms above the head may be recognized as the first act for the imaging and print instruction. Further, as shown in FIG. 34, a gesture in which a cross mark is formed with both arms in front of the chest may be recognized as the second act for the print stop instruction.

Figure 35:
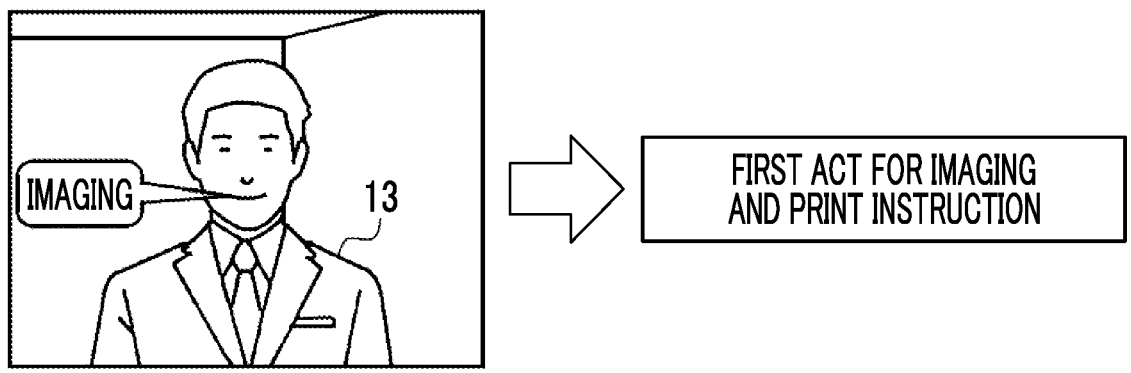
FIG. 35 is a diagram showing an uttered voice recognized as the first act.
Figure 36:
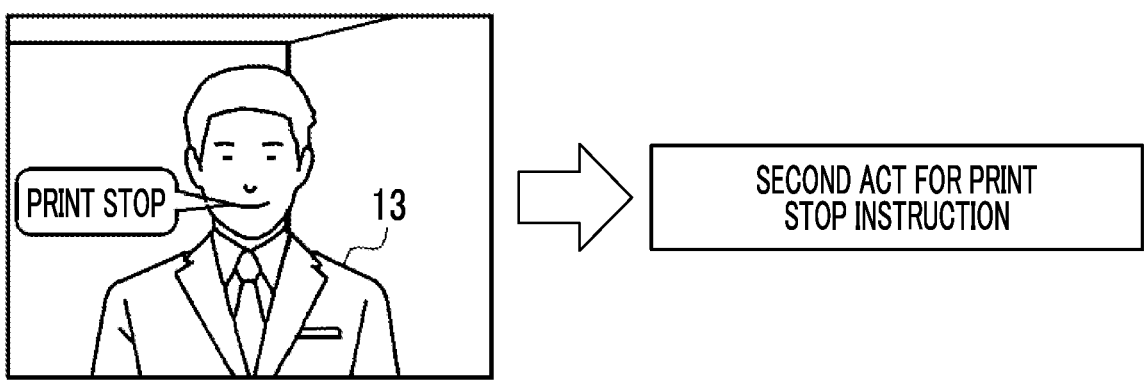
FIG. 36 is a diagram showing an uttered voice recognized as the second act.

The first act and the second act are not limited to the gestures. For example, as shown in FIG. 35, an uttered voice of "imaging" of the participant 13 may be recognized as the first act for the imaging and print instruction. Further, as shown in FIG. 36, the uttered voice of "print stop" of the participant 13 may be recognized as the second act for the print stop instruction. In this case, the digital camera with the printer 10 comprises a microphone that captures the uttered voice of the participant 13. Further, the control device 11 comprises a voice recognition unit that recognizes the uttered voice of the participant 13 captured by the microphone, instead of the gesture recognition unit 89.

The live view display screen 100 and the preview display screen 101 may be displayed in parallel. Further, the live view display screen 100 may be displayed as a nested screen in the preview display screen 101.

The participant 13 himself knows that the participant closes eyes or misses a pose at the execution timing of the imaging operation. Therefore, in some cases, the participant 13 can determine the success or failure of the imaging without checking the image 14P on the preview display screen 101. Thus, the participant 13 may be notified only of the remaining number of seconds 135 in the print standby period WPP without displaying the image 14P as a preview on the display 17.

In the above embodiment, the center CP of the face detection region 105 and the center line CL of the long side of the image 14 are matched by changing the imaging range of the camera unit 21, but the present disclosure is not limited thereto. The center CP of the face detection region 105 and the center of the image 14 may be matched. In this case, the center of the image 14 is an example of "set position" and the "center position of image" according to the technique of the present disclosure.

The set position that matches the face position is not limited to the center position of the image. The set position may be biased to either the top, bottom, left, or right of the image 14. In this case, textual information such as an exhibition name may be printed in a biased margin region.

The mechanism that changes the imaging range of the camera unit 21 is not limited to the exemplified movement mechanism 20 that moves the main body 30 front and rear and left and right. A mechanism for swinging the main body 30 top, bottom, left, and right may be used. Further, a mechanism for moving a unit of the imaging optical system 40 and the imaging element 43 may be used.

The image 14 itself output from the imaging element 43 may be printed without setting the print region 73.

The guide voices such as 116, 117, 118, 119, 120, 126, 127, 128, 136, 137, and 138 and the pseudo shutter sound 129 may be not output from the speaker 23 of the digital camera with the printer 10, but may be output from a speaker of the control device 11, for example, a speaker built in the display 17.

The guide voices such as "Please stand at imaging position.", "Please make V sign.", and "Please make stop sign of showing palm open in case where printing needs to be stopped." may be spoken by an administrator of the imaging system 2 at the site.

The pseudo shutter sound 129 is not limited to the exemplified "click". Any sound indicating that the shutter 42 has been released may be used, and a chime sound or the like may be used.

The person to be imaged is not limited to the participant 13 of the exemplified exhibition. The person to be imaged may be a participant in other events such as a wedding party and outdoor recreation. Further, the person to be imaged is not limited to the participant of the event, but may be a general user who performs self-imaging using the digital camera with the printer 10.

A print medium for printing the image 14P is not limited to the instant film 15. Plain paper may be used.

In the above embodiment, an example is shown in which the computer 70 of the digital camera with the printer 10 and the control device 11 perform the function of the "control device of digital camera with printer" of the present disclosure, but the present disclosure is not limited thereto. All the functions of the "control device of digital camera with printer" of the present disclosure may be performed by the computer 70 of the digital camera with the printer 10. On the contrary, all the functions of the "control device of digital camera with printer" of the present disclosure may be performed by the control device 11.

Figure 37:
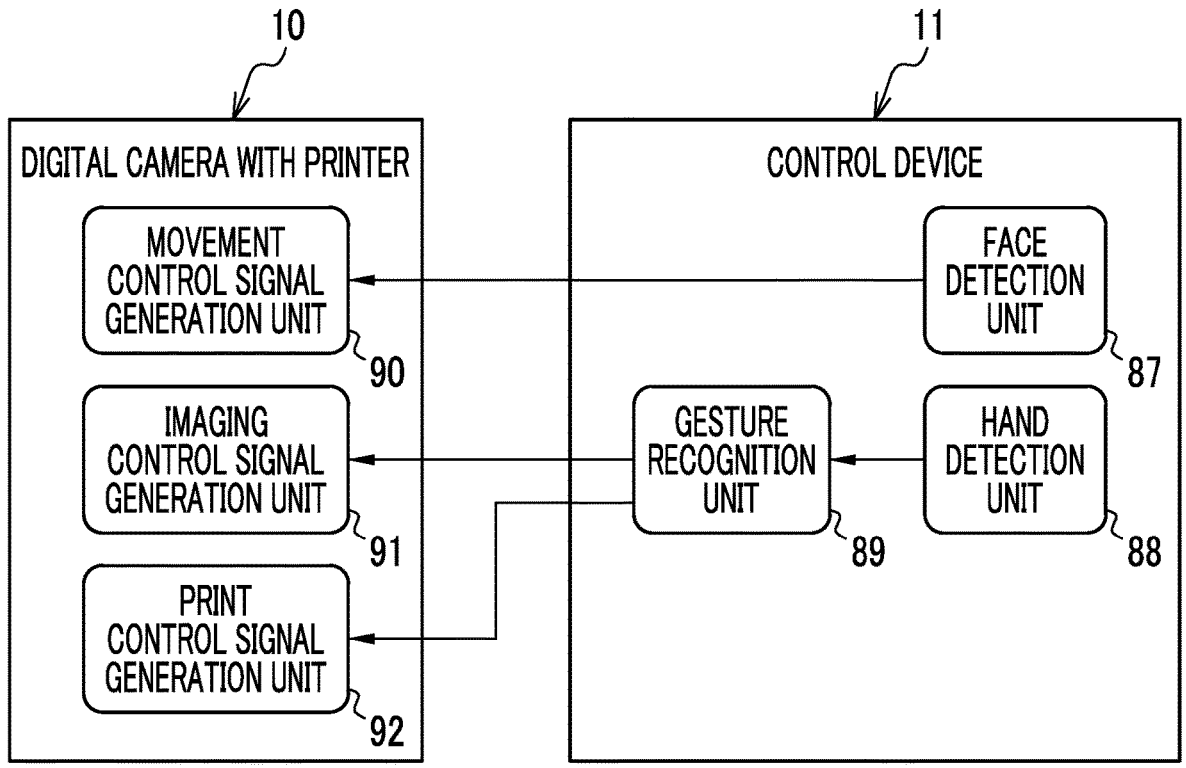
FIG. 37 is a diagram showing an aspect in which functions of a movement control signal generation unit, an imaging control signal generation unit, and a print control signal generation unit are assigned to the digital camera with the printer.

FIG. 37 shows an aspect in which the functions of the movement control signal generation unit 90, the imaging control signal generation unit 91, and the print control signal generation unit 92 are performed by the digital camera with the printer 10. In this case, the face detection result by the face detection unit 87 of the control device 11 is transmitted to the movement control signal generation unit 90 of the digital camera with the printer 10. Further, the gesture recognition result by the gesture recognition unit 89 of the control device 11 is transmitted to the imaging control signal generation unit 91 and the print control signal generation unit 92 of the digital camera with the printer 10.

Figure 38:
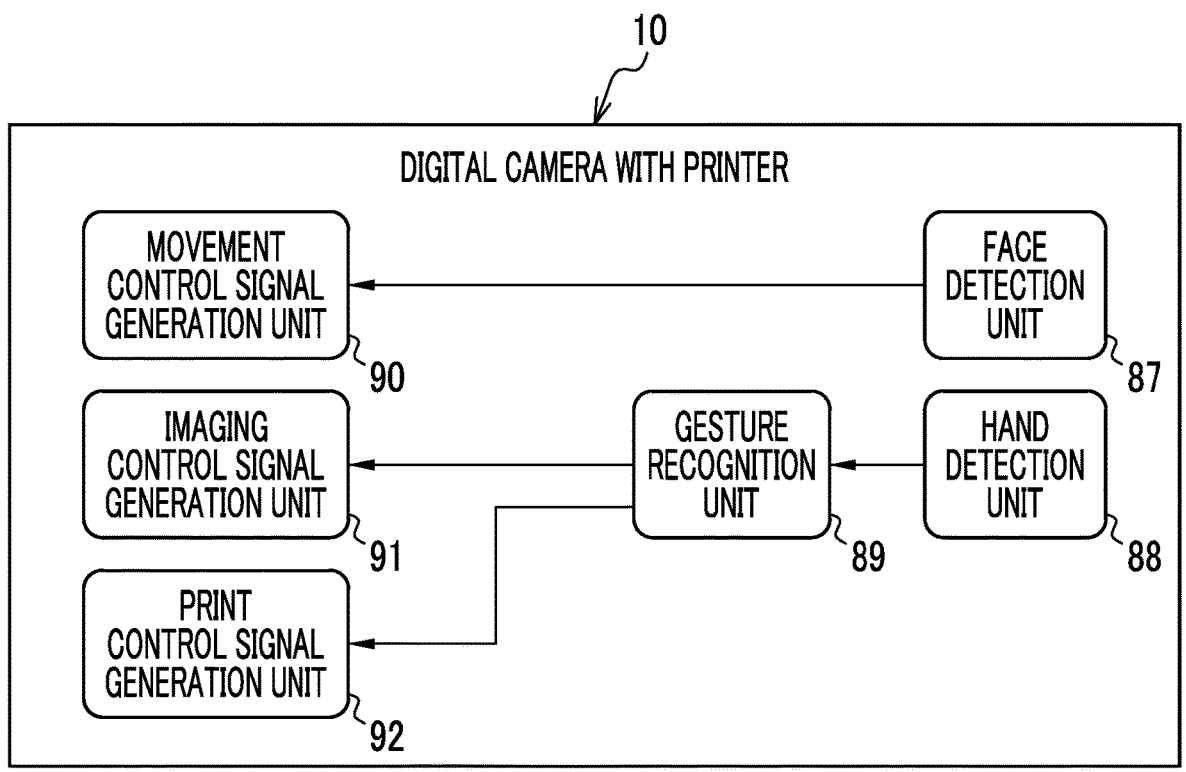
FIG. 38 is a diagram showing an aspect in which the functions of the face detection unit, the hand detection unit, the gesture recognition unit, the movement control signal generation unit, the imaging control signal generation unit, and the print control signal generation unit are assigned to the digital camera with the printer.

FIG. 38 shows an aspect in which the functions of the face detection unit 87, the hand detection unit 88, the gesture recognition unit 89, the movement control signal generation unit 90, the imaging control signal generation unit 91, and the print control signal generation unit 92 are performed by the digital camera with the printer 10. In this case, all of the face detection, the hand detection, the gesture recognition, and the generation of respective control signals 25 to 27 are performed by the digital camera with the printer 10. The control device 11 in this case has only the function of the display control unit 94.

In the above embodiment, one gesture recognition unit 89 is responsible for the "first recognition unit" and the "second recognition unit" according to the technique of the present disclosure, but the recognition unit corresponding to the "first recognition unit" and the recognition unit corresponding to the "second recognition unit" may be separated. Further, the image reception unit 85 and the remaining number of sheets reception unit 86 may be integrated into one reception unit. As described above, a hardware configuration of the computer constituting the control device 11 may be changed as appropriate according to required performance such as processing capacity, safety, and reliability. The same applies to the hardware configuration of the computer 70 (controller 56). Not only the hardware but also the programs such as the operation programs 60 and 80 may be duplicated or stored in a plurality of storage devices in a distributed manner for the purpose of ensuring safety and reliability.

In the above embodiment, for example, as the hardware structure of the processing units that execute various pieces of processing such as the movement control unit 65, the imaging control unit 66, the print control unit 67, the voice control unit 68, the image reception unit 85, the remaining number of sheets reception unit 86, the face detection unit 87, the hand detection unit 88, the gesture recognition unit 89, the movement control signal generation unit 90, the imaging control signal generation unit 91, the print control signal generation unit 92, the control signal transmission unit 93, and the display control unit 94, the following various processors can be used. The various processors include a programmable logic device (PLD) which is a processor whose circuit configuration is changeable after manufacturing such as a field programmable gate array (FPGA) and/or a dedicated electric circuit which is a processor having a circuit configuration exclusively designed to execute specific processing such as an application specific integrated circuit (ASIC), and the like, in addition to the controller 56 and the CPU 77 which are general-purpose processors that execute software (operation programs 60 and 80) to function as the various processing units. A graphics processing unit (GPU) may be used instead of the controller 56 and the CPU 77.

One processing unit may be configured by one of the various processors or may be configured by a combination of two or more processors of the same type or different types (for example, combination of a plurality of FPGAs and/or combination of a CPU and an FPGA or combination of a CPU and a GPU). The plurality of processing units may be configured of one processor.

As an example of configuring the plurality of processing units with one processor, first, there is a form in which one processor is configured by a combination of one or more CPUs and software and the processor functions as the plurality of processing units, as represented by computers such as a client and a server. Second, there is a form in which a processor that realizes the functions of the entire system including the plurality of processing units with one integrated circuit (IC) chip is used, as represented by a system-on-chip (SoC) or the like. As described above, the various processing units are configured using one or more of the various processors as the hardware structure.

More specifically, a circuitry combining circuit elements such as semiconductor elements may be used as the hardware structure of the various processors.

The above various embodiments and/or various modification examples can be combined as appropriate in the technique of the present disclosure. It is needless to say that the technique of the present disclosure is not limited to each of the above embodiments and various configurations can be employed without departing from the gist. Further, the technique of the present disclosure extends to a storage medium that stores the program non-transitorily, in addition to the program.

The description content and the illustrated content described above are detailed descriptions of portions according to the technique of the present disclosure and are merely an example of the technique of the present disclosure. For example, the above description of the configurations, functions, actions, and effects is an example of the configurations, functions, actions, and effects of the portions according to the technique of the present disclosure. Therefore, it is needless to say that an unnecessary part may be deleted, a new element may be added, or a replacement may be performed to the description content and the illustrated content described above within a scope not departing from the gist of the technique of the present disclosure. In order to avoid complication and facilitate understanding of the portion according to the technique of the present disclosure, the description related to common general knowledge not requiring special description in order to implement the technique of the present disclosure is omitted in the above description content and illustrated content.

In the present specification, "A and/or B" is synonymous with "at least one of A or B". That is, "A and/or B" means that only A may be used, only B may be used, or a combination of A and B may be used. In the present specification, the same concept as "A and/or B" is also applied to a case where three or more matters are linked and expressed by "and/or".

All documents, patent applications, and technical standards described in the present specification are incorporated by reference in the present specification to the same extent as in a case where the incorporation of each individual document, patent application, and technical standard by reference is specifically and individually described.

What is claimed is:

1. A control device comprising:
   at least one processor,
   wherein the at least one processor is configured at least to:
   perform control of displaying, in a live view display screen, live images on a display unit, wherein the live view display screen displays a hand recognition region which detects a first gesture from a subject to be imaged and a face detection region which detects a face of the subject to be imaged,
   display, in the live view display screen, the face detection region at a center position of the image to be printed by controlling an imaging range of the camera unit so that the face detection region is at the center position of the image to be printed,
   recognize, by a camera unit controlled by the at least one processor, the first gesture which activates an imaging and print instruction that combines the imaging instruction to capture an image of the subject to be printed in combination with an instruction to print the image and start an imaging standby period upon recognizing the first gesture, the first gesture being performed by the subject who performed the first gesture and is within the imaging range of the camera unit,
   display, in the live view display screen, to inform the subject a remaining time of the imaging standby period as a part of the live view,
   cause the camera unit to perform an imaging operation of outputting the image required to be printed to a printer in response to the imaging standby period having been elapsed,
   perform control of displaying, in a preview display screen, the image required to be printed as a preview on the display unit visible to the subject to be imaged within the imaging range during a predetermined print standby period which occurs after the camera unit performs the imaging operation of outputting the image,
   display, in the preview display screen to inform the subject a remaining time of the predetermined print standby period,
   recognize, during the predetermined print standby period, a second gesture for an instruction to stop printing the image required to be printed, the second gesture being performed by the subject to be imaged within the imaging range and being different from the first gesture,
   upon recognizing the second gesture during the predetermined print standby period, cause a printer unit controlled by the at least one processor to stop printing the image required to be printed and display an instruction to perform the first gesture to start the imaging standby period, and after the predetermined print standby period has elapsed without recognizing the second gesture during the predetermined print standby period, cause the printer unit to print the image required to be printed.

2. The control device according to claim 1, wherein the at least one processor is further configured to:
perform processing of transferring the image required to be printed from the camera unit to the printer unit at a start of the print standby period.

3. The control device according to claim 1, wherein the at least one processor is further configured to:
notify the subject to be imaged that the first act has been recognized and that the second act has been recognized.

4. The control device according to claim 1, wherein the first act and the second act are different hand gestures by the subject to be imaged.

5. The control device according to claim 4, wherein the first gesture is a V sign and the second gesture is a hand sign showing 5 fingers.

6. The control device according to claim 4, wherein the first gesture is pointing a palm side toward the digital camera with the printer in a state where an index finger and a middle finger are raised and the other fingers are bent, and
the second gesture is pointing the palm side toward the digital camera with the printer in a state where all fingers are spread out.

7. The control device according to claim 1, wherein a partial region of the image is used as a print region of the printer unit, and
the at least one processor is further configured to:
perform control of displaying the print region on the image.

8. The control device according to claim 1, wherein the at least one processor is further configured to:
perform control of displaying a remaining number of sheets of a print medium.

9. The control device according to claim 8, wherein the print medium is an instant film.

10. An operation method for a control device of a digital camera with a printer having a camera unit that images a subject and sequentially outputs images representing the subject and a printer unit that prints the captured image on a print medium in response to an imaging instruction, the operation method comprising:
performing control of displaying, in a live view display screen, live images on a display unit, wherein the live view display screen displays a hand recognition region which detects a first gesture from a subject to be imaged and a face detection region which detects a face of the subject to be imaged;
displaying, in the live view display screen, the face detection region at a center position of the image to be printed by controlling an imaging range of the camera so that the face detection region is at the center position of the image to be printed;
recognizing, by the camera unit, a first gesture which activates an imaging and print instruction that combines the imaging instruction to capture an image of the subject to be printed in combination with an instruction to print the image and start an imaging standby period upon recognizing the first gesture, the first gesture being performed by the subject who performed the first gesture and is within the imaging range of the camera unit;

displaying, in the live view display screen, to inform the subject a remaining time of the imaging standby period as a part of the live view;
causing the camera unit to perform an imaging operation of outputting the image required to be printed to the printer after the imaging standby period has elapsed;
performing control of displaying, in a preview display screen, the image required to be printed as a preview on a display unit visible to the subject to be imaged within the imaging range during a predetermined print standby period which occurs after the camera unit performs the imaging operation of outputting the image;
displaying, in the preview display screen to inform the subject a remaining time of the predetermined print standby period;
recognizing, during the predetermined print standby period, a second gesture for an instruction to stop printing the image required to be printed, the second gesture being performed by the subject to be imaged within the imaging range and being different from the first gesture;
upon recognizing the second gesture during the predetermined print standby period, causing the printer unit to print the image required to be printed and display an instruction to perform the first gesture to start the imaging standby period; and
after the predetermined print standby period has elapsed without recognizing the second gesture during the predetermined print standby period, causing the printer unit to print the image required to be printed.

11. A non-transitory computer-readable storage medium storing an operation program for a control device of a digital camera with a printer having a camera unit that images a subject and sequentially outputs images representing the subject and a printer unit that prints the captured image on a print medium in response to an imaging instruction, the operation program causing a computer to:
perform control of displaying, in a live view display screen, live images on a display unit, wherein the live view display screen displays a hand recognition region which detects a first gesture from a subject to be imaged and a face detection region which detects a face of the subject to be imaged;
display, in the live view display screen, the face detection region at a center position of the image to be printed by controlling an imaging range of the camera so that the face detection region is at the center position of the image to be printed;
recognize, by the camera unit, a first gesture which activates an imaging and print instruction that combines the imaging instruction to capture an image of the subject to be printed in combination with an instruction to print the image and start an imaging standby period upon recognizing the first gesture, the first gesture being performed by the subject who performed the first gesture and is within the imaging range of the camera unit;
displaying, in the live view display screen, to inform the subject a remaining time of the imaging standby period as a part of the live view;
cause the camera unit to perform an imaging operation of outputting the image required to be printed to the printer after the imaging standby period has elapsed;
perform control of displaying, in a preview display screen, the image required to be printed as a preview on a display unit visible to the subject to be imaged within the imaging range during the predetermined print standby period which occurs after the camera unit performs the imaging operation of outputting the image;

display, in the preview display screen to inform the subject a remaining time of the predetermined print standby period;

recognize, during the predetermined print standby period, a second gesture for an instruction to stop printing the image required to be printed, the second gesture being performed by the subject to be imaged within the imaging range and being different from the first gesture;

upon recognizing the second gesture during the predetermined print standby period, cause the printer unit to print the image required to be printed and display an instruction to perform the first gesture to start the imaging standby period; and after the predetermined print standby period has elapsed without recognizing the second gesture during the predetermined print standby period, cause the printer unit to print the image required to be printed.

* * * * *